United States Patent
Subbarayan et al.

(10) Patent No.: US 10,587,580 B2
(45) Date of Patent: Mar. 10, 2020

(54) METHODS AND SYSTEMS FOR API DECEPTION ENVIRONMENT AND API TRAFFIC CONTROL AND SECURITY

(71) Applicant: Ping Identity Corporation, Denver, CO (US)

(72) Inventors: Udayakumar Subbarayan, Bangalore (IN); Bernard Harguindeguy, Atherton, CA (US); Anoop Krishnan Gopalakrishnan, Bangalore (IN); Nagabhushana Angadi, Bengaluru (IN); Ashwani Kumar, Bengaluru (IN); Santosh Sahu, Bangalore (IN); Abdu Raheem Poonthiruthi, Bangalore (IN); Avinash Kumar Sahu, Bangalore (IN); Yasar Kundottil, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 205 days.

(21) Appl. No.: 15/792,850

(22) Filed: Oct. 25, 2017

(65) Prior Publication Data

US 2018/0115523 A1    Apr. 26, 2018

(30) Foreign Application Priority Data

Oct. 26, 2016  (IN) .............................. 201611036787

(51) Int. Cl.
*H04L 29/06* (2006.01)
*G06N 20/00* (2019.01)
*G06F 21/55* (2013.01)

(52) U.S. Cl.
CPC .......... *H04L 63/0281* (2013.01); *G06F 21/55* (2013.01); *G06N 20/00* (2019.01);
(Continued)

(58) Field of Classification Search
CPC ..... H04L 63/02; H04L 63/04; H04L 63/0807; H04L 63/0876; H04L 63/1425;
(Continued)

(56) References Cited

U.S. PATENT DOCUMENTS

| | | |
|---|---|---|
| 7,209,962 B2 | 4/2007 | Boden |
| 7,743,089 B2 | 6/2010 | Putzolu |

(Continued)

FOREIGN PATENT DOCUMENTS

| | | | |
|---|---|---|---|
| WO | WO 2016/168368 | 10/2016 | |
| WO | WO-2016168368 A1 * | 10/2016 | ........... G06F 21/552 |

OTHER PUBLICATIONS

Office Action for U.S. Appl. No. 15/164,512, dated Jul. 6, 2018, 9 pages.
(Continued)

*Primary Examiner* — Hee K Song

(57) ABSTRACT

The present invention relates to the field of networking and API/application security. In particular, the invention is directed towards methods, systems and computer program products for Application Programming Interface (API) based flow control and API based security at the application layer of the networking protocol stack. The invention additionally provides an API deception environment to protect a server backend from threats, attacks and unauthorized access.

28 Claims, 12 Drawing Sheets

(52) U.S. Cl.
CPC .............. *H04L 63/02* (2013.01); *H04L 63/04* (2013.01); *H04L 63/1425* (2013.01); *H04L 63/1458* (2013.01); *H04L 63/1491* (2013.01)

(58) Field of Classification Search
CPC .............. H04L 63/1458; H04L 63/1491; H04L 63/0281; G06N 20/00; G06F 21/55; G06F 21/554; G06F 21/6281
See application file for complete search history.

(56) References Cited

U.S. PATENT DOCUMENTS

| | | |
|---|---|---|
| 8,339,959 B1 | 12/2012 | Moisand et al. |
| 8,892,665 B1 | 11/2014 | Rostami-Hesarsorkh et al. |
| 8,949,828 B2 | 2/2015 | Pafumi et al. |
| 8,973,088 B1 | 3/2015 | Leung et al. |
| 8,990,942 B2 | 3/2015 | Thakadu et al. |
| 9,307,017 B2 | 4/2016 | Wang et al. |
| 9,413,560 B2 | 8/2016 | Patil et al. |
| 9,516,053 B1 | 12/2016 | Muddu et al. |
| 9,537,756 B2 | 1/2017 | Bahadur et al. |
| 9,948,703 B2 | 4/2018 | Olivier et al. |
| 10,025,873 B2 | 7/2018 | Jackson et al. |
| 10,193,867 B2 | 1/2019 | Subbarayan et al. |
| 2001/0039586 A1 | 11/2001 | Primak et al. |
| 2002/0112189 A1 | 8/2002 | Syvanne et al. |
| 2003/0110172 A1 | 6/2003 | Selman et al. |
| 2005/0165902 A1 | 7/2005 | Hellenthal et al. |
| 2006/0159082 A1 | 7/2006 | Cook et al. |
| 2007/0165622 A1 | 7/2007 | O'Rourke et al. |
| 2007/0192506 A1 | 8/2007 | Gupta et al. |
| 2008/0016339 A1 | 1/2008 | Shukla |
| 2008/0263654 A1 | 10/2008 | Bahl et al. |
| 2008/0320582 A1 | 12/2008 | Chen et al. |
| 2009/0040926 A1 | 2/2009 | Li et al. |
| 2009/0067440 A1 | 3/2009 | Chadda et al. |
| 2009/0327459 A1 | 12/2009 | Yoo et al. |
| 2010/0333111 A1 | 12/2010 | Kothamasu et al. |
| 2011/0145842 A1 | 6/2011 | Tofighbakhsh et al. |
| 2012/0054131 A1 | 3/2012 | Williamson |
| 2012/0226820 A1 | 9/2012 | Li et al. |
| 2012/0233668 A1 | 9/2012 | Leafe et al. |
| 2012/0290511 A1 | 11/2012 | Frank et al. |
| 2012/0304244 A1 | 11/2012 | Xie et al. |
| 2013/0044764 A1 | 2/2013 | Casado et al. |
| 2013/0205028 A1 | 8/2013 | Crockett et al. |
| 2014/0059226 A1 | 2/2014 | Messerli et al. |
| 2014/0237594 A1 | 8/2014 | Thakadu et al. |
| 2014/0258771 A1 | 9/2014 | Xie et al. |
| 2014/0337268 A1 | 11/2014 | Bhattacharya et al. |
| 2014/0362681 A1 | 12/2014 | Bahadur et al. |
| 2015/0026794 A1 | 1/2015 | Zuk et al. |
| 2015/0095887 A1 | 4/2015 | Bhattacharya |
| 2015/0188760 A1 | 7/2015 | Anumala et al. |
| 2015/0188808 A1 | 7/2015 | Ghanwani et al. |
| 2015/0229579 A1 | 8/2015 | Kosim-Satyaputra et al. |
| 2015/0234639 A1 | 8/2015 | Allsbrook |
| 2015/0319226 A1 | 11/2015 | Mahmood |
| 2016/0011732 A1 | 1/2016 | Yang |
| 2016/0065672 A1 | 3/2016 | Savage et al. |
| 2016/0234168 A1 | 8/2016 | Leung et al. |
| 2016/0308721 A1 | 10/2016 | Dellisanti et al. |
| 2016/0308900 A1 | 10/2016 | Sadika et al. |
| 2016/0352588 A1 | 12/2016 | Subbarayan et al. |
| 2016/0352867 A1 | 12/2016 | Subbarayan et al. |
| 2016/0366155 A1 | 12/2016 | El-Moussa et al. |
| 2018/0115578 A1 | 4/2018 | Subbarayan et al. |
| 2018/0337891 A1 | 11/2018 | Subbarayan et al. |
| 2018/0337892 A1 | 11/2018 | Subbarayan et al. |
| 2018/0337893 A1 | 11/2018 | Subbarayan et al. |
| 2018/0337894 A1 | 11/2018 | Subbarayan et al. |
| 2019/0114417 A1 | 4/2019 | Subbarayan et al. |

OTHER PUBLICATIONS

Office Action for U.S. Appl. No. 15/164,555, dated Jan. 9, 2019, 19 pages.
Office Action for U.S. Appl. No. 15/164,587, dated Feb. 22, 2018, 17 pages.
Office Action for U.S. Appl. No. 16/050,958, dated Dec. 31, 2018, 7 pages.
Office Action for U.S. Appl. No. 16/050,996, dated Nov. 16, 2018, 6 pages.
Office Action for U.S. Appl. No. 16/051,026, dated Dec. 13, 2018, 6 pages.
Extended European Search Report for European Application No. 18200235.2, dated Feb. 11, 2019, 9 pages.
Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).
Office Action for U.S. Appl. No. 15/164,512, dated Feb. 28, 2019, 18 pages.
Office Action for U.S. Appl. No. 15/164,512, dated Aug. 15, 2019, 16 pages.
Office Action for U.S. Appl. No. 16/050,915, dated Sep. 6, 2019, 18 pages.
Office Action for U.S. Appl. No. 15/793,671, dated Jul. 8, 2019, 36 pages.

* cited by examiner

METHODS AND SYSTEMS FOR API DECEPTION ENVIRONMENT AND API TRAFFIC CONTROL AND SECURITY

CROSS-REFERENCE TO RELATED APPLICATION

This application claims priority under 35 U.S.C. § 119 to Indian Patent Application No. 201611036787 filed Oct. 26, 2016, the contents of which are incorporated by reference herein.

FIELD

The present invention relates to the field of networking and API/application security. In particular, the invention is directed towards methods, systems and computer program products for Application Programming Interface (API) based flow control and API based security at the application layer of the networking protocol stack.

BACKGROUND

Existing state of art solutions relating to flow control based network security implements flow control at lower level network layers—for example layers 2, 3 or 4 i.e. within the subnet (or MAC) stack, internet (or IP) stack and transport (or TCP/UDP) stack. These existing approaches are based on monitoring Ethernet frames and IP packets at the network level—and are effective in achieving flow control between specific end network devices. Such solutions for API security have so far adopted a singular approach—focusing on one particular attack at a time using user entered policies. Current implementations do not take into account multiple connections from multiple sources to multiple APIs or application servers—over time—nor are current implementations capable of identifying complete attacks. As a result, sophisticated attacks and distributed attacks implemented by hackers are not discovered or identified in time to be able to do something about it.

SUMMARY

An objective of the present invention is to secure API/Application/Web servers/Message Queues, which may use different types of APIs. The invention is additionally capable of being applied to message queue brokers.

The invention enables client application to API server connections to be handled by one or more proxies—which one or more proxies may advantageously be organized in one or more clusters. The proxies are capable of being implemented as a front end/intermediate for cloud computing solutions as well as private datacenters.

The invention is capable of being implemented for handling requests from a diverse set of client types, including without limitation JavaScript, Android/iOS mobile apps, IoT devices, and any device that is capable of connecting with or raising a service request on an API server.

The invention is additionally capable of supporting a plurality of API traffic patterns, including but not limited to:
  a. Request/response,
  b. Streaming (uni-directional and bi-directional streaming), and
  c. Publish/Subscribe The invention additionally provides methods, systems and computer programs for detecting unauthorized or malicious attempts to access a target API server/Message Broker/Message Queue.

In an embodiment, the invention provides a proxy configured for routing client messages to one or more target APIs. The proxy comprises a processor configured to identify or record at least one of (a) parameter data corresponding to one or more client side parameters, wherein the parameter data corresponding to the one or more client side parameters is identified based on analysis of API layer data extracted from data messages received at the proxy, and each of the one or more client side parameters comprises a parameter descriptive of client side behavior detected at the proxy, and (b) parameter data corresponding to one or more server side parameters, wherein the parameter data corresponding to the one or more server side parameters is identified based on analysis of API layer data extracted from data messages received at the proxy, and each of the one or more server side parameters comprises a parameter descriptive of (1) requests for server side data received from one or more clients or (2) server side responses to data messages received from one or more clients.

The proxy additionally includes a proxy router configured to (i) receive a client message, and (ii) discard the received client message without onward transmission to an API server identified in the received client message, in response to a determination that (a) initiating a process for forwarding the received client message to the API server would result in parameter data corresponding to a client side parameter or a server side parameter to exceed a predefined threshold value, or (b) receiving a response to the received client message from the API server would result in parameter data corresponding to a server side parameter to exceed a predefined threshold.

The processor within the proxy may be configured to identify or record both of parameter data corresponding to one or more client side parameters, and parameter data corresponding to one or more server side parameters.

In an embodiment, the client side parameters include one or more of client spike, bytes-in-spike, TCP connection spike, message spike and wild card topic substitution. The server side parameters may include one or more of server spike, server connection, server connection queuing, bytes-out spike, and topic publisher and subscriber quota.

In an embodiment, the processor is configured to maintain discrete sets of data records corresponding to client side parameters or server side parameters, for each API server within a server backend.

In a further embodiment, a determination at the proxy router whether to discard the received client message without onward transmission to an API server identified in the received client message, is based on one or more of device ID, IP address and oAuth2 token corresponding to a client.

The proxy router may be configured to (i) transmit the received client message to an API server identified in the received client message, in response to a determination that (a) initiating a process for forwarding the received client message to the API server does not result in parameter data corresponding to a client side parameter or a server side parameter exceeding a predefined threshold value, or (b) receiving a response to the received client message from the API server does not result in parameter data corresponding to a server side parameter exceeding a predefined threshold.

The invention additionally provides a system for securing one or more API servers. The system comprises a proxy cluster configured for routing client messages to one or more target APIs implemented on the one or more API servers. The proxy cluster comprises a plurality of networked proxies, wherein each of the plurality of proxies are configured for routing client messages to the one or more target APIs.

Each proxy comprises a processor configured to identify or record at least one of (i) parameter data corresponding to one or more client side parameters, wherein (a) the parameter data corresponding to the one or more client side parameters is identified based on analysis of API layer data extracted from data messages received at the proxy, (b) each of the one or more client side parameters comprises a parameter descriptive of client side behavior detected at the proxy, and (ii) parameter data corresponding to one or more server side parameters, wherein (a) the parameter data corresponding to the one or more server side parameters is identified based on analysis of API layer data extracted from data messages received at the proxy, and (b) each of the one or more server side parameters comprises a parameter descriptive of (i) requests for server side data received from one or more clients or (ii) server side responses to data messages received from one or more clients.

Each proxy may further include a proxy router configured to (i) receive a client message, and (ii) discard the received client message without onward transmission to an API server identified in the received client message, in response to a determination that (a) initiating a process for forwarding the received client message to the API server would result in parameter data corresponding to a client side parameter or a server side parameter to exceed a predefined threshold value, or (b) receiving a response to the received client message from the API server would result in parameter data corresponding to a server side parameter to exceed a predefined threshold. Additionally, each of a plurality of proxies within the proxy cluster are in an embodiment, configured to synchronize one or more data states of said proxy with corresponding one or more data states of at least one other proxy within the plurality of proxies, and wherein the data states under synchronization comprise client side parameter data states or server side parameter data states.

In a specific system embodiment, the data states under synchronization comprise server side parameter data states and exclude client side parameter data states.

The invention also provides a system configured for routing client messages to one or more target APIs implemented on a secured server backend. The system includes a proxy comprising (i) a processor configured to detect indicators of compromise based on API layer data extracted from client messages received at the proxy, wherein indicators of comprise are detected responsive to any one of (a) determining that a target API name extracted from a client message matches a decoy API name that is determinable by scanning of API data on the proxy, (b) or determining that a target API name extracted from a client message does not match any API to which the proxy is configured to route client messages, (ii) a proxy router configured to respond to detection of an indicator of compromise by routing a client message corresponding to the detected indicator of compromise to a decoy API having an API name that matches the target API name extracted from a client message corresponding to the detected indicator of compromise, wherein said decoy API is communicably isolated from the secured server backend, and (iii) one or more processor implemented decoy APIs configured to respond to client messages received from the proxy router by (a) initiating network communication with a client that has generated the received client message, and (b) recording information corresponding to said client and client messages generated by said client.

The system may be configured to respond to a determination that a target API name extracted from a client message does not match any API to which the proxy is configured to route client messages, by (i) generating a processor implemented decoy API having an API name that matches the target API name, and routing the client message to the generated processor implemented decoy API, wherein (a) the generated processor implemented decoy API is communicably isolated from the secured server backend, and (b) said generated processor implemented decoy API is configured to respond to client messages received from the proxy router by (1) initiating network communication with a client that has generated the received client message, and (2) recording information corresponding to said client and client messages generated by said client.

The invention additionally provides a method for routing client messages to one or more target API. The method comprises (i) receiving a client message at a proxy interposed as a network communication gateway to a server backend configured to implement one or more APIs, (ii) discarding the received client message without onward transmission to an API server identified in the received client message, in response to a determination that (a) initiating a process for forwarding the received client message to the server backend would result in parameter data corresponding to a client side parameter or a server side parameter to exceed a predefined threshold value, or (b) receiving a response to the received client message from the server backend would result in parameter data corresponding to a server side parameter to exceed a predefined threshold. In an embodiment of the method, (i) parameter data corresponding to the one or more client side parameters is identified based on analysis of API layer data extracted from data messages received at the proxy, (ii) each of the one or more client side parameters comprises a parameter descriptive of client side behavior detected at the proxy, (iii) parameter data corresponding to the one or more server side parameters, is identified based on analysis of API layer data extracted from data messages received at the proxy, and (iv) each of the one or more server side parameters comprises a parameter descriptive of (a) requests for server side data received from one or more clients or (b) server side responses to data messages received from one or more clients.

The method may comprise identifying or recording both of parameter data corresponding to one or more client side parameters, and parameter data corresponding to one or more server side parameters.

In a method embodiment, the client side parameters may include one or more of client spike, bytes-in-spike, TCP connection spike, message spike and wild card topic substitution. In an embodiment, the server side parameters may include one or more of server spike, server connection, server connection queuing, bytes-out spike, and topic publisher and subscriber quota.

For the purposes of a specific method embodiment, a determination whether to discard the received client message without onward transmission to an API server identified in the received client message, may be based on one or more of device ID, IP address and OAuth2 token corresponding to a client.

The method may additionally include (i) transmitting the received client message to an API server identified in the received client message and implemented within the server backend, in response to a determination that (a) initiating a process for forwarding the received client message to the API server does not result in parameter data corresponding to a client side parameter or a server side parameter exceeding a predefined threshold value, or (b) receiving a response to the received client message from the API server does not result in parameter data corresponding to a server side parameter exceeding a predefined threshold.

In an embodiment of the method the proxy may be configured to synchronize one or more data states of said proxy with corresponding one or more data states of at least one other proxy that is interposed as a network communication gateway to the server backend, and wherein the data states under synchronization comprise client side parameter data states or server side parameter data states. In a specific embodiment of the method, the data states under synchronization comprise server side parameter data states and excludes client side parameter data states.

The invention additionally provides a method for routing client messages to one or more target APIs implemented on a secured server backend. The method comprises (i) detecting an indicator of compromise based on API layer data extracted from client messages received at the proxy, wherein the detected indicator of comprise is detected responsive to any one of (a) determining that a target API name extracted from a client message matches a decoy API name that is determinable by scanning of API data on the proxy, or (b) determining that a target API name extracted from a client message does not match any API to which the proxy is configured to route client messages, (ii) responding to detection of an indicator of compromise by routing a client message corresponding to the detected indicator of compromise to a decoy API having an API name that matches the target API name extracted from a client message corresponding to the detected indicator of compromise, wherein said decoy API is communicably isolated from the secured server backend, (iii) initiating at the decoy API, network communication with a client that has generated the received client message, and (iv) recording information corresponding to said client and client messages generated by said client.

The method may further include the step of responding to a determination that the client in network communication with said decoy API is a client in breach of one or more predefined security policies, by routing one or more communications from said client to an external honeypot server that is communicably isolated from the secured server backend.

In a specific embodiment, the method may comprise responding to determining that a target API name extracted from a client message does not match any API to which the proxy is configured to route client messages, by generating a processor implemented decoy API having an API name that matches the target API name, and routing the client message to the generated processor implemented decoy API, wherein (i) the generated processor implemented decoy API is communicably isolated from the secured server backend, and (ii) said generated processor implemented decoy API is configured to respond to client messages received from the proxy router by (a) initiating network communication with a client that has generated the received client message, and (b) recording information corresponding to said client and client messages generated by said client.

The invention additionally provides computer program products for routing client messages to one or more target APIs, comprising a non-transitory computer readable medium having a computer readable program code embodiment therein, the computer readable program code comprising instructions for implementing any of the methods or method embodiments describe in this specification.

BRIEF DESCRIPTION OF ACCOMPANYING DRAWINGS

Figure 12:
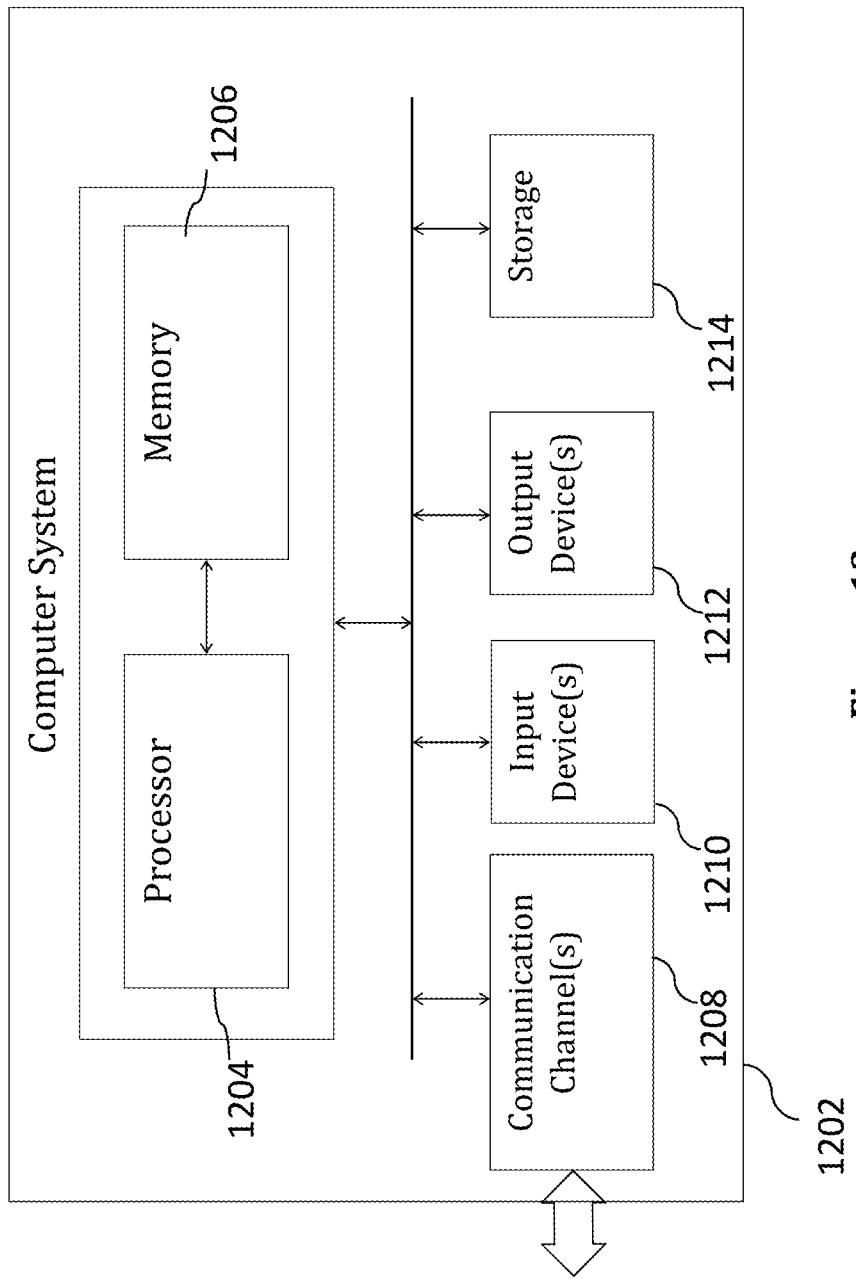

FIG. 12 illustrated an exemplary system in accordance with the present invention.

DETAILED DESCRIPTION

For the purposes of the invention "anomaly" shall mean any abnormal, unusual, unexpected or strange artifact, event or trend in API characteristics (for example, characteristics such as traffic volume, bandwidth use, protocol use etc.) that could potentially represent the presence of an attack, threat or indicator of compromise. Anomalies are identified in comparison with a baseline of normal network or user behavior that has been established over a period of time. Once certain parameters have been defined as normal, departures from normal parameters or ranges may be flagged as anomalous.

For the purposes of the present invention "API server" shall mean any server running at least one instance of at least one API of any type, and shall include API gateway(s).

For the purposes of the invention "client" shall mean any device having information processing and network communication capabilities. The types of clients may vary widely and include but are not limited to desktop computers, laptop computers or notebook computers, personal digital assistants, handheld computers, cellular phones, servers and Internet of Things (IOT) sensors or servers, gateways, brokers, software bots ("bots") or other such devices.

For the purposes of the present invention, "client side parameters" shall mean parameters or variables that are descriptive of client side behaviour that is detected at the proxy node by analysis of API layer data extracted from client requests and/or data messages received from clients.

For the purposes of the invention "indicator(s) of compromise" shall mean an artifact or event in network characteristics that indicate with high confidence, unauthorized access or attempts to access a system or data without appropriate authorization. Indicators of compromise are identified in comparison with a baseline of normal network or user behavior that has been established over a period of time. Once certain parameters have been defined as normal, departures from normal parameters or ranges may be flagged as indicators of compromise.

For the purposes of the invention "metrics" shall mean a set of measurements used to measure or reflect levels, types and quantum of API communications or web services or API traffic. Exemplary metrics may include performance characteristics such as number of request/response, client access URLs, number of user sessions/non sessions, most popular methods/client devices, details of server responses including error codes, timing information for access, session ids, delay, provisioning, availability, restoration times for outages, average and maximum outages periods, average and maximum response times, latency, and delivery rates (i.e., throughput), actual session Quality of Service (QoS), traffic routes, payload size, response time, cookie types, number of requests and end-user application transactions.

For the purposes of the present invention, "proxy" or "proxy node" shall mean any device having information processing and network communication capabilities that is configured to route communications from a client to a server and/or vice versa. The types of proxies may vary widely and include but are not limited to routers, load balancers, full proxies, half proxies, security proxies and IOT proxies.

For the purposes of the present invention, "proxy cluster" or "cluster of proxies" shall mean a plurality of proxies. For the purposes of the present invention, proxies within a proxy cluster may be understood as being interconnected in an overlay network.

For the purposes of the invention, "server" shall mean any device having information processing and network communication capabilities, and which is configured to provide one or more services to a requesting client, over a communication network. The types of servers may vary widely, and include but are not limited to API servers, application servers, microservices, web servers, FTP servers, IOT brokers or gateways, message brokers, or service oriented architecture (SOA) servers.

For the purposes of the invention, "server backend" shall mean a set of one or more servers.

For the purposes of the invention, "server side parameters" shall mean parameters or variables that are descriptive of (i) requests for server side data that are detected at the proxy node by analysis of API layer data extracted from client requests and/or data messages received from clients, and/or (ii) server side responses to client requests or data messages received from clients, as detected at the proxy node by analysis of API layer data received from server side data messages.

API based web applications, distributed applications and client server applications may use one or more proxy nodes (including servers, virtual machines and Linux containers) interposed between clients and servers for routing, load balancing and security at the API layer. Proxy nodes of the above type distribute incoming client requests or messages among multiple servers to ensure one or more of targeted routing, balanced server utilization, minimized server overloads, and high availability.

Proxies of router or load balancer type receive client requests or messages, select an appropriate server(s) for processing the requests or messages and transmit the requests or messages to the selected server(s).

Figure 1:
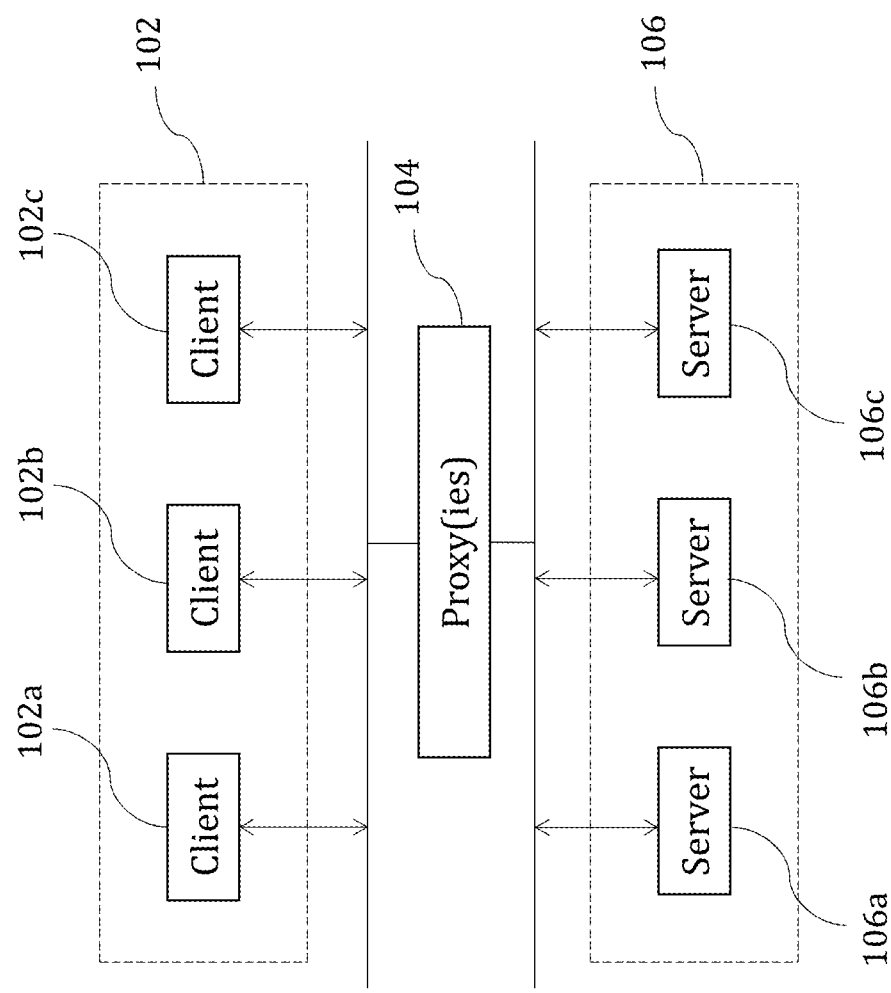
FIG. 1 illustrates networking architectures comprising one or more proxies positioned intermediate to clients and servers.

FIG. 1 illustrates a network architecture 100 comprising a proxy 104 disposed as a network intermediate between clients 102 (i.e. clients 102a, 102b and 102c) and servers 106 (106a, 106b and 106c).

Based on information retrieved from a DNS server or other name server, requests or messages from client 102 for services from server backend 106 are directed to proxy 104. Proxy 104 transmits the received requests or messages to an appropriate server (106a to 106c) within server backend 106. Depending on the configuration of proxy 104, responses from servers 106a to 106c may first be received at proxy 104 and thereafter redirected to requesting client 102.

In implementing proxy functionality (for example, routing or load balancing), a proxy receives data packets addressed to a target service or server. The proxy transmits the data packets to an appropriate server based on predefined policies and techniques (e.g. routing or load balancing policies and techniques).

The present invention relies on innovative network architectures and proxy configurations to implement API level security in respect of the server backend.

As described in further detail below, a first aspect of the invention involves a method of API security that may be employed by one or more proxies (either operating individually or within a proxy cluster), for implementing routing decisions (for example routing or load balancing decisions) involving client requests or messages received at said proxies. The invention achieves this by maintaining at each proxy, data corresponding to a first set of API parameters, and data corresponding to a second set of API parameters. The first set of API parameters comprises client related API parameters, and the second set of API parameters comprise server related API parameters. The proxy is configured to arrive at routing or access related decisions based on an analysis of the first set of API parameters and/or the second set of API variables. In embodiments of the invention that involve a cluster of proxy nodes, the invention additionally involves a synchronization between proxy nodes, wherein data corresponding to one or more API parameters maintained at a proxy node is synchronized across proxy nodes within the proxy node cluster.

In a second aspect of the invention, the proxy may be configured to identify anomalies, threats and/or attacks through implementation of one or more decoy APIs configured to emulate a functional API, but which precluded access to either the server backend or to protected data and/or protected APIs within the server backend.

The invention achieves its objectives by receiving at a proxy, client messages designating a target API. In certain embodiments, the invention additionally relies on API server responses received at the proxy. The proxy extracts information from data packets corresponding to the client message or server response, and analyses the extracted information for detecting attacks, anomalies or threats. Responsive to an anomaly, attack or threat identification, the client message may be rejected or further server responses may be blocked. Detection of attacks, anomalies or threats may be based on a determination whether the client message/server response is consistent with predefined rules or predefined thresholds that have been set out in respect of one or more API layer parameters.

Figure 2:
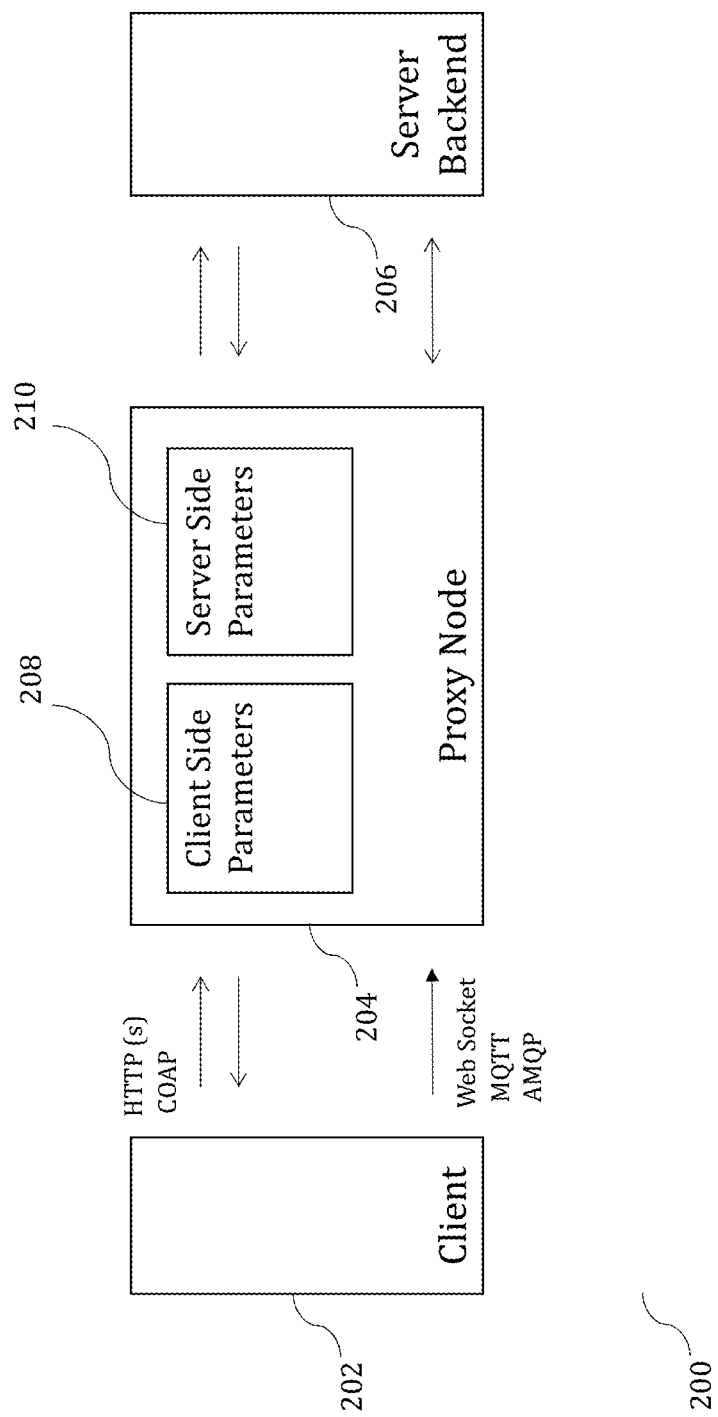
FIGS. 2 to 5 illustrate networking architectures comprising a proxy positioned intermediate to clients and servers, said proxy being configured to implement routing decisions based on exemplary client side parameters and server side parameters.

FIG. 2 illustrates an exemplary system 200 in accordance with teachings of the present invention, comprising proxy 204 disposed as a network intermediate between one or more instances of client(s) 202 and a server backend 206. Proxy 204 comprises one or more repositories 208 of data records corresponding to client side parameters and one or more repositories 210 of data records corresponding to server side parameters. By monitoring and analysing client side parameters and/or server side parameters at proxy 204, the invention enables API layer flow control between clients 202 and server backend 206. As illustrated in FIG. 2, the implementation of teachings of the invention at proxy node 204 enables API layer flow control to be established effectively for a variety of API types and/or messaging protocols, including for example, HTTP, COAP, Web Socket, MQTT, and AMQP based messaging protocols/APIs.

In embodiments of the invention, the following exemplary client side parameters and server side parameters may be used for API layer flow control:
Client side parameters
  Client spike
  Bytes-in spike
  TCP connection spike
  Message spike
  Wild card topic subscription
Server side parameters
  Server spike
  Server connection
  Server connection queuing
  Bytes-out spike
  Topic Publisher and subscriber quota In an embodiment, a proxy node (either a standalone proxy or a node within a proxy cluster) may maintain a separate set of data corresponding to client side and/or server side parameters for every back-end API server. The data states corresponding to such parameters may represent one or more of (i) configured capacity for each server, (ii) cluster wide current number of connections to each server or API, (iii) each individual API proxy node's number of connections to each server or API, and (iv) time series data for the number of server or API connections maintained by each proxy node within a cluster.

Each of the above parameters and the manner in which such parameters may be used for the purposes of implementing one or more embodiments of the invention, and are described in detail in connection with FIGS. 3 to 5.

Figure 3:
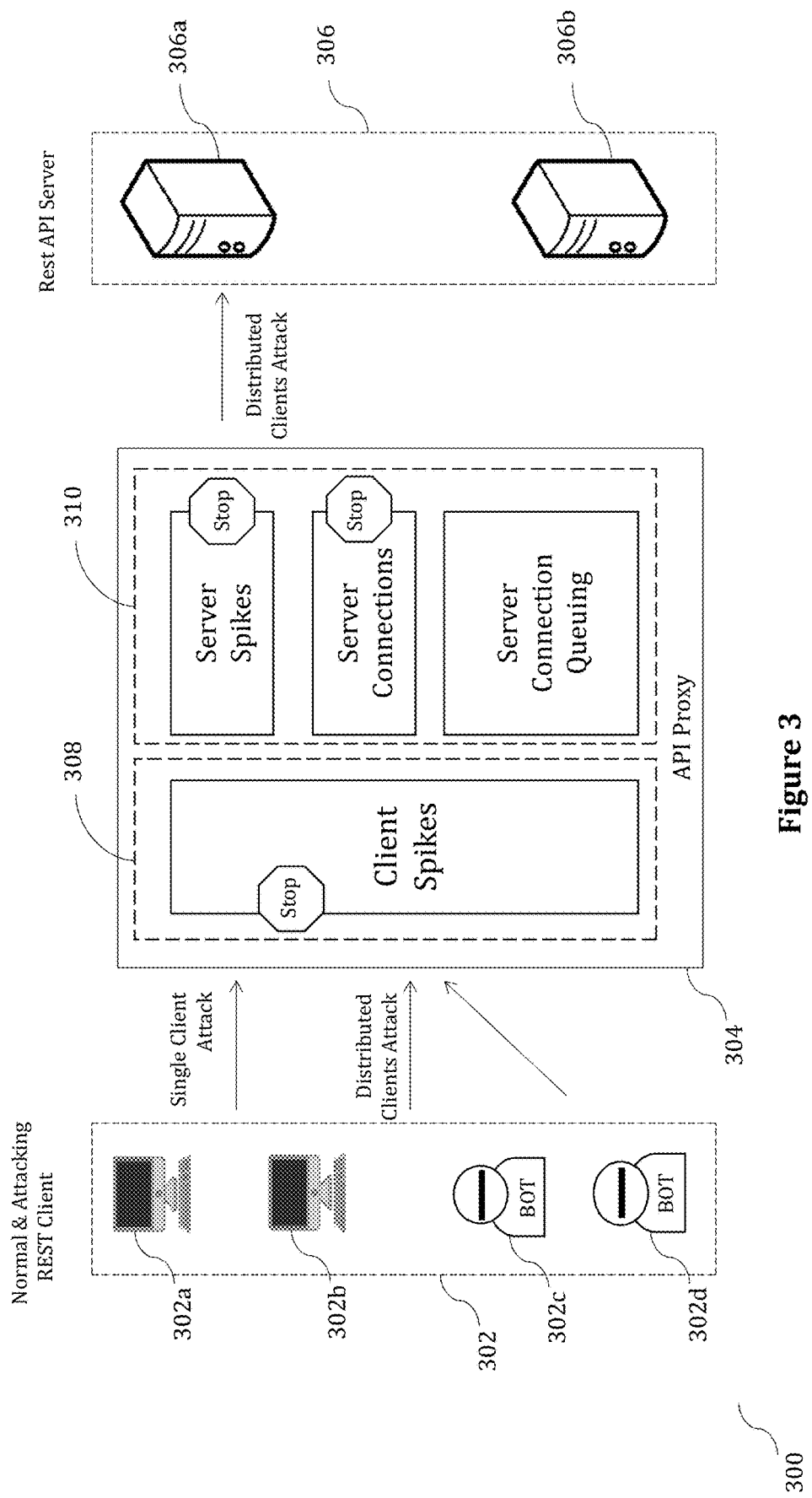

FIG. 3 illustrates an exemplary system 300 in accordance with teachings of the present invention, comprising API proxy 304 disposed as a network intermediate between one or more instances of client(s) 302 (comprising exemplary client terminal devices 302a and 302b and bots 302c and 302d) and a server backend 306 comprising a plurality of servers 306a and 306b. API proxy 304 comprises one or more repositories 308 of data records corresponding to client side parameters and one or more repositories 310 of data records corresponding to server side parameters. While the illustration of FIG. 3 is an exemplary embodiment of a proxy node configured to implement API layer flow control between REST clients and API REST servers, it would be understood that the illustrated embodiment may be equally applied for other API client and server types.

For the purposes of understanding the embodiment of FIG. 3, it may be assumed that individual clients 302a to 302d may include normal or legitimate clients, as well as malicious, harmful or attacking clients. API proxy 304 is configured to distinguish between the two and to implement flow control to protect server backend 306 from the malicious or attacking clients, while permitting legitimate clients to access the server backend. In FIG. 3, API proxy 304 achieves this by monitoring data corresponding to (i) client side parameters 308 comprising data corresponding to client spikes, and (ii) server side parameters 310, comprising data corresponding to one or more of server spikes, server connections and server connection queuing.

"Client spikes" and/or "client spike control" as implemented within the API proxy 304 of FIG. 3 refers to a client side parameter which involves data monitoring and corresponding flow control in cases involving abnormally high traffic volumes from any client (for example high traffic volume originating from a single client or client device as a result of denial of service (DoS) attack. By monitoring and controlling the number of inbound requests from API clients (for example REST API clients), and rejecting more than a certain number of inbound requests received from a specific client, API proxy protects API servers within server backend 306 from being overloaded by a single client. In an embodiment, implementation of client spike control may be based on monitoring and correlating of incoming API service requests with an originating client device/terminal/bot/IoT device/IoT sensor/server/etc.

"Server spikes" and/or "Server spike control" and/or "Aggregate server spike limits" and/or "API overload control" as implemented within API proxy 304 of FIG. 3 refers to control of a server side parameter involving protection of any API (e.g. any REST API) or API server from an aggregated overload of client traffic received from one or more API proxies or clusters of API proxies (such as would by typically seen in the case of traffic load bursts, distributed denial of service (DDoS) attacks etc.)—where the API or API server is receiving traffic from one or more API proxy nodes from one or more clusters. By limiting the total amount of client traffic received at a target API or target API server from one or multiple API proxies (in one or more clusters), the API proxies or API proxy clusters can limit the total API request volume generated across a cluster of proxy nodes targeting a specific API or API server. It would be understood that in an embodiment, server spike control or API overload control relies on synchronization of data states between a plurality of API proxies within one or more API proxy clusters (which is discussed in more detail below)—which ensures that each API proxy can determine the total amount of client traffic that has been received at the proxy cluster or that has been transmitted to a target API or target API server.

"Server connection" and/or "Server connection control" or "API connection control" as implemented within API proxy 304 of FIG. 3 refers to control of a server side parameter involving preventing server or API overload by restricting or eliminating more than a defined number of many simultaneous connections or requests for client sessions that are received at one API proxy 304 or across a cluster of API proxies. In implementation, this is achieved by restricting the total number of API connections (for example REST API connections) that are allowed/passed on from a proxy or a cluster of proxies to a target API or an API server. By controlling the total number of inbound requests that are transmitted to a specific API by a proxy or by all proxies within one or more API proxy clusters, implementation of server or API connections control protects a target API or API server from being overloaded by requests sent by multiple client devices/terminals/bots/IoT devices (which is often observed in DDoS attacks). It would be further appreciated (and is discussed in more detail below) that in an embodiment, server connections control relies on synchronization of data states between a plurality of API proxies within one or more API proxy clusters—which ensures that each API proxy can determine the total number of inbound requests that are made on/transmitted to a specific API or API server at or through a cluster of API proxies.

"Server connection queuing" or API connection queuing" as implemented within API proxy 304 of FIG. 3 refers to control of a server side parameter involving queuing and retrying/retransmission of REST API sessions requests by an API proxy/API proxy clusters when a target API/target API server is busy. By doing so, the API proxy ensures that legitimate API requests are not rejected or lost due to target API or target API server overload. In an embodiment, server connection queuing may also comprise rejecting further client requests or client data messages if a server connection queue is full.

By implementing API layer flow control based on the client side parameters and server side parameters discussed above, the API proxy 304 of FIG. 3 can prevent multiple security threats and attacks, including single client attacks or distributed client attacks.

Figure 4:
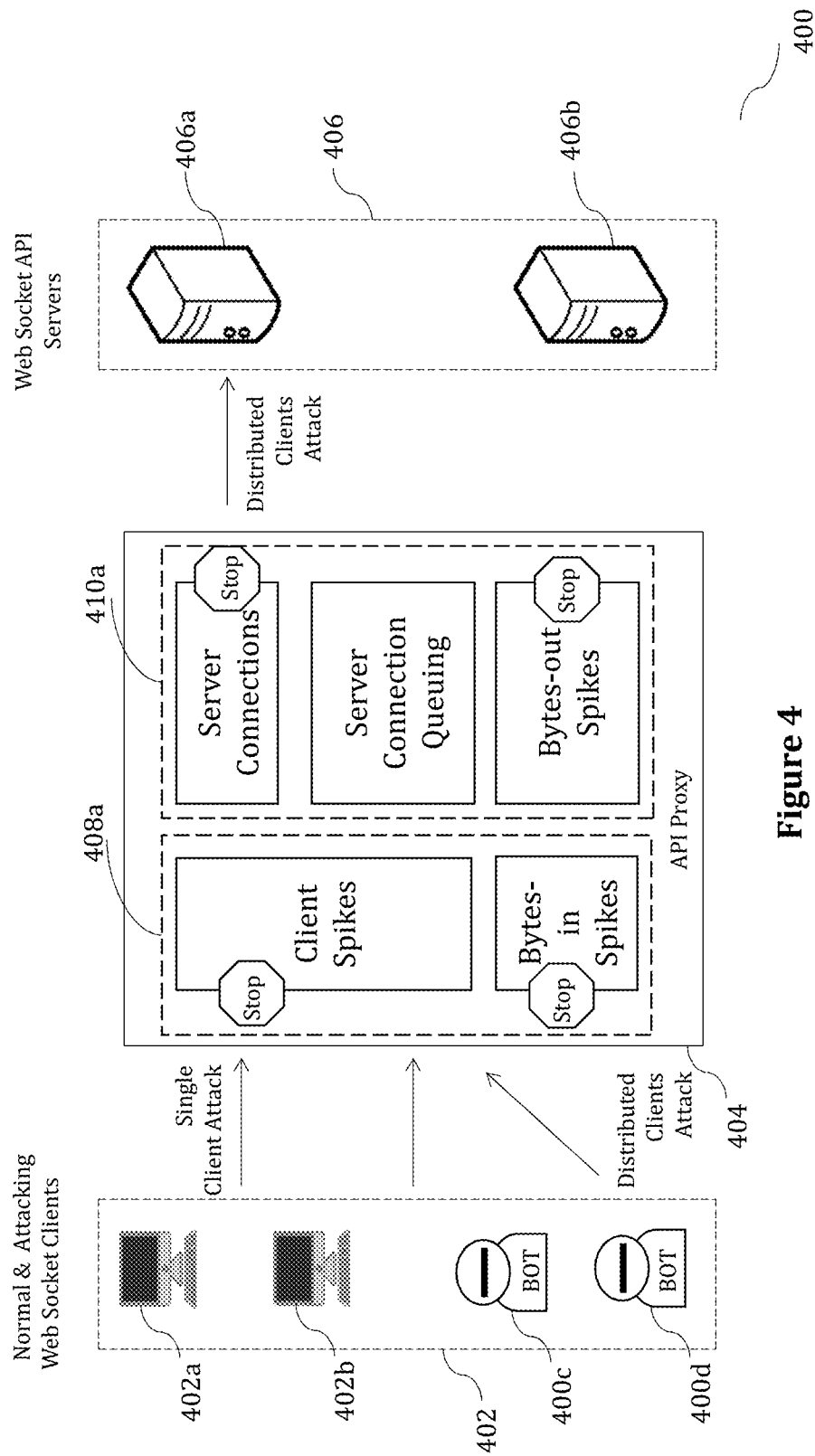

FIG. 4 illustrates an exemplary system 400 in accordance with teachings of the present invention, comprising API proxy 404 disposed as a network intermediate between one or more instances of client(s) 402 (comprising exemplary client terminal devices 402a and 402b and bots 402c and 402d) and a server backend 406 comprising a plurality of servers 406a and 406b. API proxy 404 comprises one or more repositories 408 of data records corresponding to client side parameters and one or more repositories 410 of data records corresponding to server side parameters.

In FIG. 4, API proxy 404 is configured for flow control of Web Socket API traffic based on appropriately selected front-end and back-end variables/parameters, to protect servers from DOS, DDOS, data exfiltration and other attacks. In FIG. 4, the server backend 406 comprises a plurality of Web Socket API servers, having an API proxy (or API proxy clusters) located between the API servers and client devices. In the illustrated embodiment, monitoring of front-end variables/parameters may include but is not limited to monitoring of data indicative of client-spikes, and bytes-in spikes, while monitoring of back-end variables/parameters may include but is not limited to monitoring of data indicative of aggregate server-connections, aggregated API connections, server connection queuing, API connection queuing and bytes-out spikes. Each of these front-end and back-end parameters/variables are explained below.

Client spikes or "client spike control—protects against abnormally high traffic volumes from any client (e.g. DoS attack). By controlling inbound HTTP requests from API clients, the API proxy protects API servers and APIs from being overloaded by a single client.

For the purpose of monitoring the parameter "Bytes-in Spikes", the API proxy or one or more clusters of API proxy may be configured to monitor and control the maximum number of bytes per unit of time, from any single IP address that is received at an API proxy node. In cases where the maximum number of bytes is exceeded, the API proxy or cluster(s) of API proxy nodes may restrict/reject transmission of further requests/messages from that IP address to a target API or target API server. The unit of time can be in seconds, minutes or hours or any other unit of time.

Aggregate server connection limits or API connection limits—The API proxy 404 (or one or more proxy clusters) may be configured to prevent server overload or API overload by restricting/rejecting more than a predefined number of simultaneous connections from across one API proxy node or one or more clusters of API Proxy nodes to a target API or API server. By restricting the total number of simultaneous API connections allowed from a cluster of proxy nodes to a specific API on each server, the API proxy or proxy cluster prevents API and API server overload.

Server connection queuing—The API proxy 404 (or proxy clusters) may be configured to queue and retry API session requests when API servers or APIs are busy. In an embodiment, server connection queuing may also comprise rejecting further client requests or client data messages if a server connection queue is full.

For the purposes of monitoring the parameter "Bytes-out Spike", the API proxy 404 (or proxy clusters) may be configured to restrict or control the maximum number of bytes per time period sent from API proxy 404 (or proxy clusters) to a single IP address or client device. The unit of time can be in seconds, minutes or hours or any other unit of time.

While the illustration of FIG. 4 is an exemplary embodiment of a proxy node configured to implement API layer flow control between Web Socket clients and Web Socket API servers, it would be understood that the illustrated embodiment may be equally applied for other API client and server types. Additionally, while not illustrated in FIG. 4, API proxy 404 may be configured for monitoring data and implementing flow control based on any other client side parameters or server side parameters that have already been discussed in connection with FIG. 3.

Figure 5:
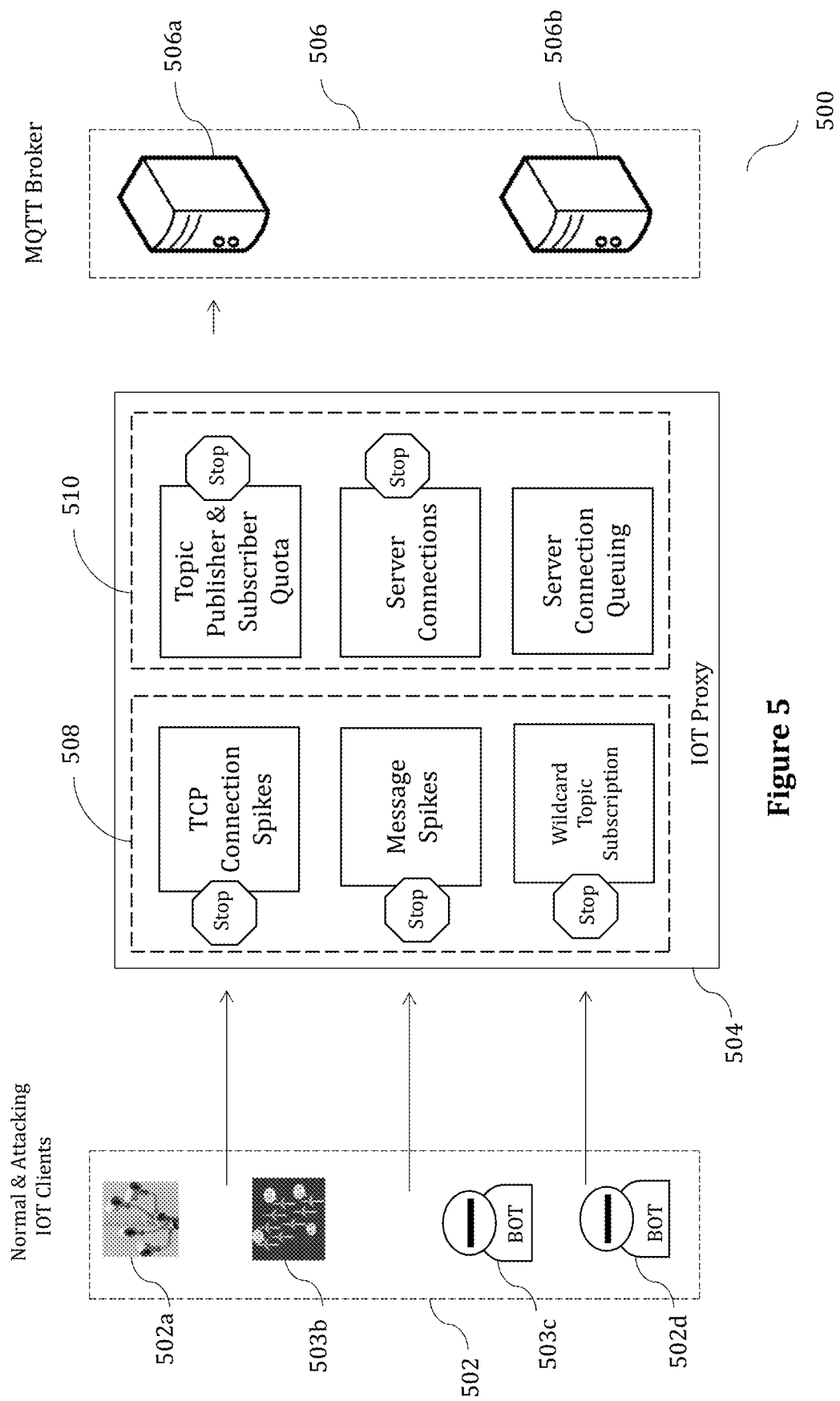

FIG. 5 illustrates an exemplary system 500 in accordance with teachings of the present invention, comprising Internet of Things (IoT) proxy 504 disposed as a network intermediate between one or more instances of IoT client(s) 502 (comprising exemplary IoT devices 502a and 502b and bots 502c and 502d) and a server backend 506 comprising a plurality of servers 506a and 506b. IoT proxy 504 comprises one or more repositories 508 of data records corresponding to client side parameters and one or more repositories 510 of data records corresponding to server side parameters.

In FIG. 5, proxy 504 is an IoT proxy (or a cluster of IoT proxies) configured for flow control of MQTT traffic based on appropriately selected front-end and back-end variables/parameters, to protect servers from various attacks from malicious client devices/bots/IoT devices/etc. The illustrated embodiment may be configured to support both MQTT over TCP and MQTT over Web Socket, both with and without encryption. In the exemplary API proxy of FIG. 5, monitoring of client side parameters may include but is not limited to monitoring of (i) number of TCP connections per IP source to limit client spike, (ii) number of TCP connections per client-ID to limit client spike, (iii) number of messages per TCP connection per unit time (ingress), (iv) number of messages per TCP connection per unit time (egress) and (v) number of wildcard subscriptions per topic. Monitoring of server side parameters may include but is not limited to monitoring of (i) maximum number of publishers to a topic (in the case of a proxy cluster, such monitoring may be on a cluster wide basis), (ii) maximum number of subscribers to a topic (in the case of a proxy cluster, such monitoring may be on a cluster wide basis), (iii) server connection quota to a broker (in the case of a proxy cluster, such monitoring may be on a cluster wide basis), and (iv) implementing server side connection queuing. In each of the above cases, if the detected parameters on either client side or server side exceed a maximum threshold, the IoT proxy may be configured to reject subsequent client requests or client data messages until the monitored parameters are under control or within permissible limits.

In certain embodiments of the invention, the intermediate proxy (304, 404, 504) illustrated in FIGS. 3, 4 and 5 may comprise a cluster of individual proxy nodes. Each proxy or proxy node within a cluster may include (i) a processor, (ii) a proxy router configured to transmit received client message to one or more servers identified based on a specified routing policy, and (iii) a synchronization controller configured to respond to a defined synchronization event, by synchronizing one or more data states of the proxy node with corresponding one or more data states of at least one other proxy node within the plurality of proxy nodes. The synchronization controller may be configured to respond to a defined synchronization event by synchronizing the one or more data states of the proxy node with corresponding one or more data states of every other proxy node within the plurality of proxy nodes.

Figure 6:
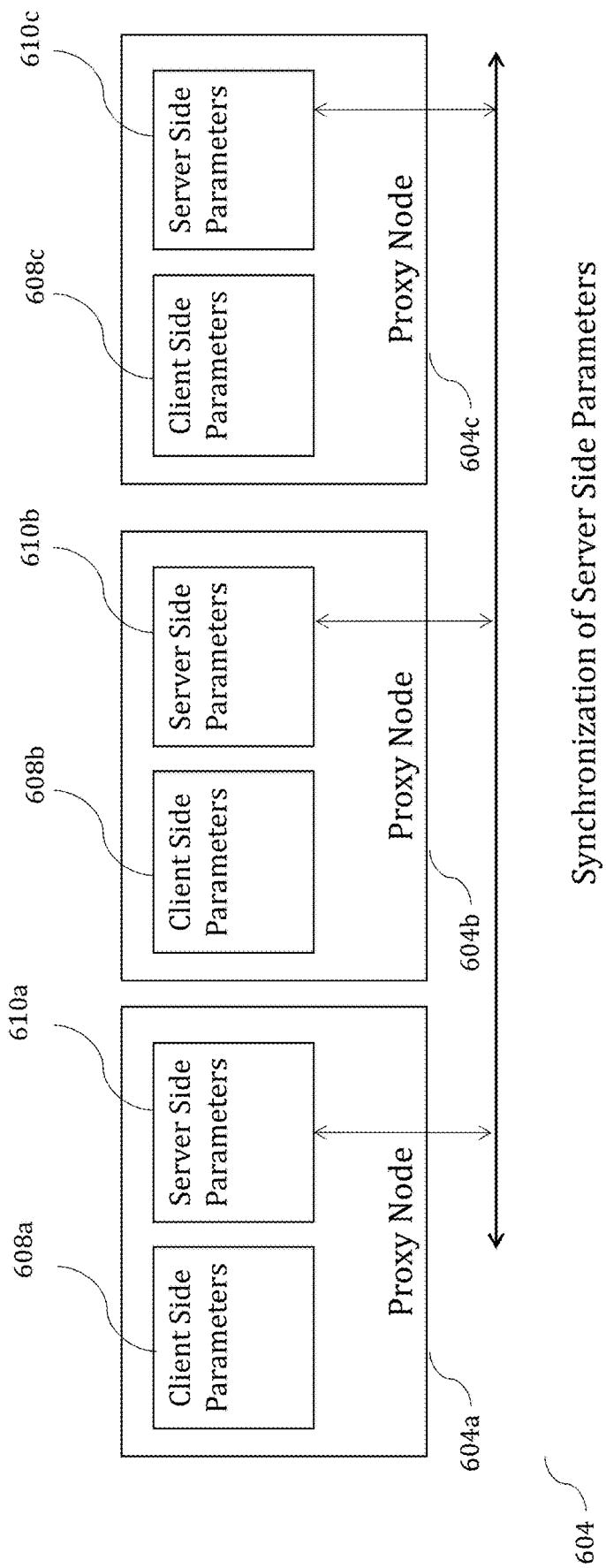
FIG. 6 illustrates an exemplary proxy cluster configured for peer to peer synchronization of parameter data between proxies.

FIG. 6 illustrates an embodiment of the invention, where the intermediate proxy (for example proxies 304, 404 and 504 of FIGS. 3, 4 and 5) comprise a proxy cluster 604 comprising proxies 604a, 604b and 604c. In the illustrated embodiment, each of proxies 604a to 604c are configured to respond to a defined synchronization event by synchronizing the data states of the server side parameters of each proxy node 604a to 604c within the proxy with corresponding one or more data states of every other proxy node within the plurality of proxy nodes. As a consequence of such synchronization, each proxy 604a to 604c within proxy cluster 604 have a synchronized state insofar as data states corresponding to server side parameters within each proxy node is concerned. In a specific embodiment, the synchronization of data states between proxies in the cluster excludes synchronization of data states corresponding to client side parameters within each proxy node—for achieving computational and storage efficiencies. By synchronizing server side parameter data states between all proxy nodes within a proxy cluster, the invention enables each proxy cluster to monitor and control API access and API server access by considering server side parameters on a cluster wide basis—instead of on an individual proxy basis, which further improves each proxy's capabilities to detect and prevent distributed attacks and threats.

Figure 7:
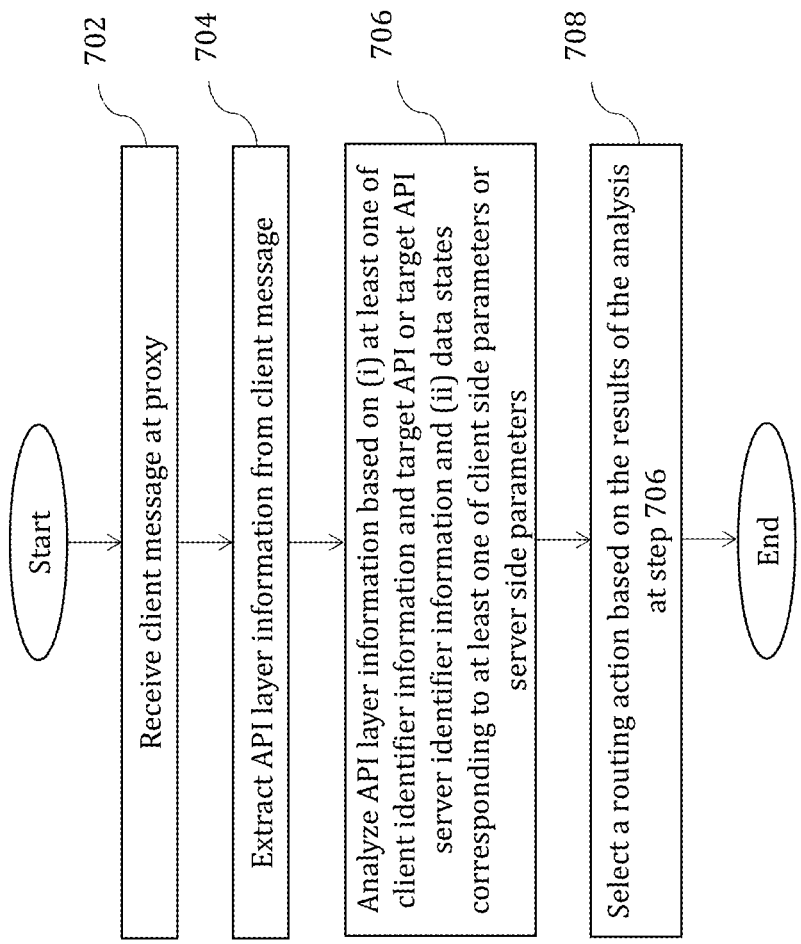
FIG. 7 illustrates a method of flow control in accordance with teachings of the present invention.

FIG. 7 illustrates a method for detecting and preventing unauthorized or malicious attempts to access a target API/API server/Message Broker/Message Queue or server backend in accordance with the teachings of the present invention.

Step 706 comprises receiving a client message or a client request at a proxy that is positioned as a network intermediate to client devices and a server backend. Step 704 thereafter comprises extracting API layer information from the client message. In an exemplary embodiment, the API layer information may include one or more of device ID, IP address and/or OAuth2 token corresponding to the client, identifier or a target API/target API server, and information describing the data request made by the client.

Step 706 thereafter comprises using (i) at least one of client identifier information and target API or API server identifier information and (ii) data states corresponding to at least one of client side parameters or server side parameters that are stored within a data repository associated with said proxy—the purposes of determining whether the client message requires to be classified as an attack, threat or an indicator of compromise. In embodiments of the method, client side parameters that may be used for the analysis at step 706 may include parameters establishing any of client spikes, bytes-in-spikes, TCP connection spikes, message spikes and wildcard topic subscription. Server side parameters that may be used for the purpose of the step 706 analysis may include parameters establishing any of server spikes, server connection spikes, server connection queueing, bytes-out spikes and topic subscriber and publisher quotas. In an embodiment, the analysis at step 706 may include determining whether the received client request is in violation of one or more prescribed thresholds that have been established in connection with any one or more of the above described client side or server side parameters.

Based on the results of the analysis as step 706, the proxy may select an appropriate routing action. In an embodiment, based on the analysis at step 706 resulting in a determination that the client message is a legitimate request and not a threat or attack, the proxy may select to either route the client message onward to the target API or target API server. Alternatively, in the event the analysis at step 706 results in classifying the client message as a threat, attack or indicator of compromise, the proxy may take one or more predefined routing actions associated with identification of a threat, attack or indicator of compromise—including discarding the client message or request without routing it to the target API or target API server.

Figure 8:
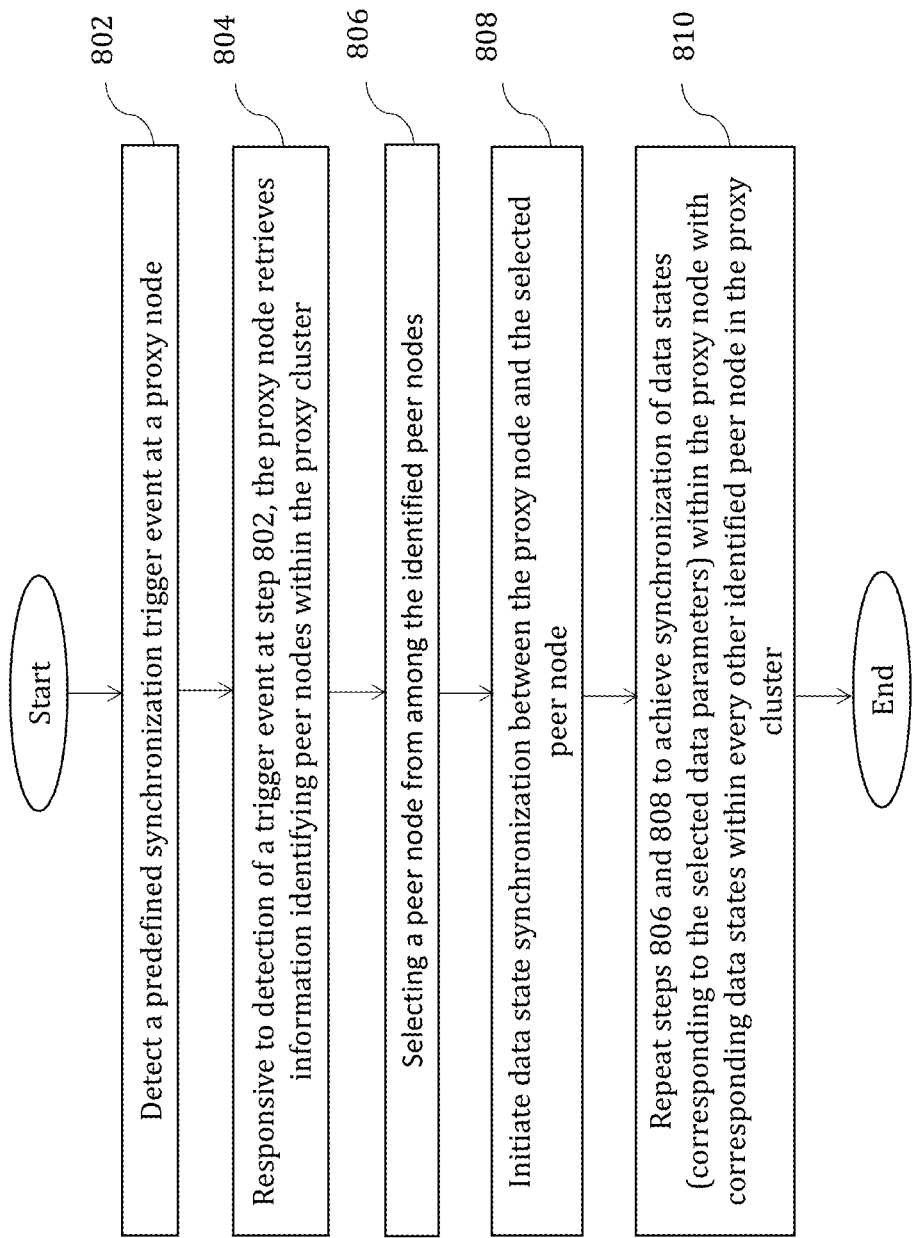
FIG. 8 illustrates a method of peer to peer synchronization of flow control parameters between proxy nodes in a proxy cluster.

FIG. 8 illustrates a method of achieving peer-to-peer synchronization between proxy nodes within a proxy cluster in accordance with the teachings of the present invention. For the purposes of FIG. 8, it will be understood that each peer node is a proxy node 304, 404 or 504 of the type described in connection with FIG. 3, 4 or 5. Further, the method of peer-to-peer synchronization in FIG. 8 is described in terms of achieving data state synchronization between a proxy node and all peer proxy nodes (i.e. all other proxy nodes) within the proxy cluster.

Step 802 of FIG. 8 comprises detection of a predefined synchronization trigger event at a proxy node. The synchronization trigger event may comprise any predefined event based trigger—and in an embodiment may comprise a time based event trigger. In an embodiment of the invention, the synchronization trigger event may comprise a trigger instruction generated at a proxy node upon expiry of a predefined time period from the last trigger instruction. In an embodiment of the invention, the synchronization trigger event may comprise a trigger instruction generated when a proxy node is bootstrapped into a proxy cluster, or when a proxy node resumes operations within a proxy cluster subsequent to recovery from a state of failure.

At step 804, responsive to detection of a trigger event at step 802, the proxy node retrieves information identifying peer nodes within the proxy cluster.

Step 806 comprises selecting a peer node from among the identified peer nodes. Step 808 thereafter comprises initiating data synchronization at the proxy node—to achieve synchronization of data states corresponding to one or more server side parameters associated with the proxy node, with (ii) a data state of corresponding server side parameters associated with the selected peer node. In an embodiment of the invention, initiating data synchronization at a proxy node comprises establishing distinct read and write connections with every other proxy node that said proxy node synchronizes with. In an embodiment, the distinct read and write connections with every other proxy node that the proxy node synchronizes with, may be implemented by initializing separate read and write pipe endpoints for every such other proxy node.

Step 810 comprises repeating steps 806 and 808 to achieve synchronization of data states (corresponding to the selected data parameters) within the proxy node with corresponding data states within every other identified peer node in the proxy cluster.

The synchronization between proxy nodes in a cluster is in an embodiment, a real time continuous synchronization process that uses a backplane without affecting client traffic to the backend API servers.

By implementing method steps of FIG. 8 across all peer proxy nodes within a proxy cluster, the method ensures that all proxy nodes within the proxy cluster have synchronized data states corresponding to server side parameters.

By implementing the various embodiments of the invention described above, the invention enables restriction/control of API traffic at the granularity of any of the servers supporting any particular API—even if each has a different capacity in comparison with the others. Additionally, multiple APIs may be supported by one server, in which case the invention may be configured to restrict traffic to each API supported by that one server.

In addition to the methods and system for flow control described above, the present invention additionally provides for detecting unauthorized or malicious attempts to access a target API or API server/Message Broker/Message Queue etc.

It has been found that to achieve unauthorized access, attackers typically use a large number of various client devices, IP devices and client-IDs to hide their identity. Further, before they launch a full attack on any API, they typically scan an API server or a front-end intermediate server to discover the various APIs hosted on one or more API servers (or on one or more API servers' back-end) and their characteristics. In certain cases, scanning a server may involve brute-force based or dictionary based (or a combination thereof) attempts to discover APIs hosted on an API server or API back-end. Once an API is discovered through scanning, the client device/IP device tries to contact the discovered API by sending messages/queries to said API to obtain responses and further information about such APIs.

The invention exploits this methodology by including one or more decoy/dummy/fake/inactive/replica APIs ("decoy API") within the API proxy or API proxy cluster or other front-end or backend network devices, including but not limited to load balancers, any type of proxies, API servers, application servers, network device, etc. The decoy API may in an embodiment be non-functional and may be implemented by way of multiple instances on one or more API proxies or network devices, preferably with different/differing/misleading API names. The decoy API may be of any type, including without limitation REST/HTTP, Web Socket, MQTT APIs, COAP, AMQP and any other API type used for data transfer. In an embodiment, decoy API names may be selected to avoid overlap with names of genuine/functional APIs implemented on the API server backend.

The API front-end (including client application software, application website code and/or DNS lookup entries) may be carefully designed to ensure that names of the decoy APIs are not made available as a consequence of any legitimate use/access of an API server. Since the decoy API is never used in any legitimate application or by a regular user having legitimate intent to access, only a user (i.e. hacker) who scans APIs on the API proxy or proxy clusters or the network devices on which they are implemented (for example, using botnets or other techniques), would discover these decoy APIs and attempt to use them/access them. The API proxy or proxy cluster or network device is accordingly configured to treat any request or message directed to a decoy API (e.g. indicating the decoy API as the target API) as suspicious, and as indicating an anomaly or attack (or attempt to attack) the APIs/API servers.

Figure 9:
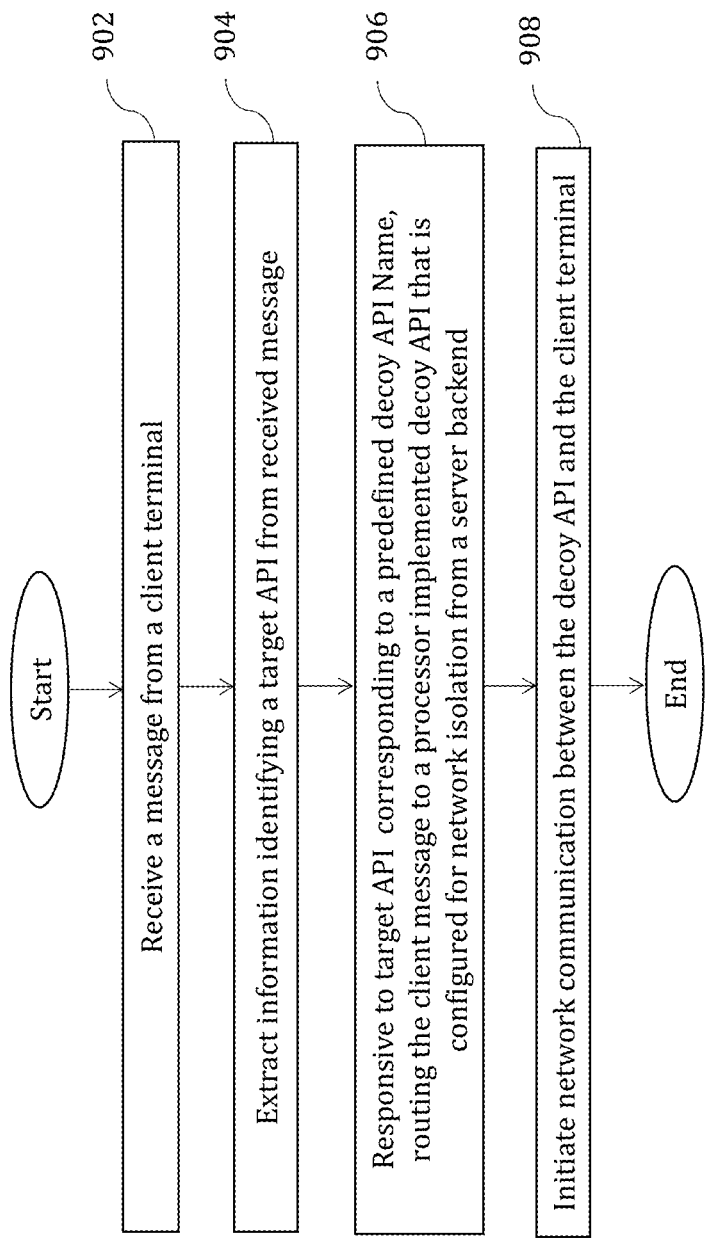
FIGS. 9 and 10 illustrate methods of decoy API based API/application security.

FIG. 9 illustrates an exemplary method for implementing decoy API based API/application security.

Step 902 comprises receiving a client message or client request from a client terminal. In an embodiment, the client message or client request is received at a proxy node disposed intermediate to clients and a server backend. Step 904 involves extracting information identifying a target API from the received message. At step 906, responsive to the identified target message corresponding to the API name of a decoy API, the client message is routed to a processor implemented decoy API that is in network isolation from a server backend. Step 906 thereafter comprises initiating network communication between the decoy API and the client terminal, for the purposes of interacting with attackers and obtaining more information about the attackers and the attack patterns. In an embodiment, the information received by the decoy API may be analyzed for detecting and identifying one or more attack patterns. The attack patterns may thereafter be added to a library of attack patterns or a library of indicators of compromise—such that, the proxy may respond to future instances or detection of similar or identical attack patterns, by rejecting or discarding or appropriately re-routing the client messages responsible for such future instances of similar or identical attack patterns.

By isolating the decoy API from the server backend, the method ensures that malicious or probing client messages seeking to obtain unauthorized server access are prevented from being routed to the server and causing any damage or harm or unauthorizedly accessing or extracting data from the system. Additionally, the decoy APIs are in an embodiment, purposefully designed to interact with attackers using real or fake data to get various levels of insight into attackers' methods and devices used which are not limited to user agents, time of access, volume of traffic, etc. The invention stores and shares all the IP addresses, and any additional information identifying the suspicious connections. Such information may be used by systems to drop those connections immediately, continue observing the hacker's activities with respect to those decoy APIs, report those connections via alerts, email and other means of communications, display information dashboards, provide comprehensive reports, etc. In an embodiment of the invention one or more decoy APIs may be stored on each API proxy within a proxy cluster or a variety of network devices—either under the same, similar or distinct API names.

The invention allows creation of decoy APIs which to a hacker or malicious device would appear to consist of a normal API path—to create a deception environment. The deception environment may be used to capture various information on the API hackers and to also continue to observe the action of the hacker on the APIs.

In an embodiment, a decoy API may be configured either as an out-of-context API or as an in-context API.
  Out of context API—consists of a standalone decoy API which is independent of real APIs. To make it appear like other APIs, additional URLs may be generated to represent API paths to mislead attackers.
  In context API—consists of a decoy API created as a list of URLs within a real API. The URLs are mixed with URLs of real API paths, but each path is unique and does not lead to the protected server backend.

It would be understood that decoy APIs require no changes or updates to backend application servers. Even when the decoy API uses the root of an existing API, the application server operates independently without any awareness of the decoy API(s).

Implementing decoy APIs creates an API deception environment that may be configured to respond to attackers with fake responses which can be defined by the administrator. The sequence of attacker requests and the traffic generated by attacker in communicating with the decoy API represents an attack pattern to analyze. This sequence can be captured and used for forensic analysis.

In an embodiment, payload and metadata received from an attacker at a decoy API may be forwarded to an analyzer (Decoy API System analyzer) which captures the data for further analysis.

In an embodiment, response to identification of clients which are attacking real APIs, requests and data messages from such attacking clients can redirect the hacker traffic to the Decoy API System analyzer for further real-time observation. In a specific embodiment, the Decoy API System and analyzer captures data representing one or more (and preferably all) of the commands or methods used on the system by a client that has been identified as an attacker, threat or anomaly, and the associated data and payloads etc.—which data may be used to observe, record and analyze the attacking techniques.

The decoy API or the Decoy API System analyzer may be configured to respond to the attacker and record the interaction to learn attack patterns. In the event a client or device that has been identified as an attacker by the decoy API or by the Decoy API System analyzer subsequently attempts to access a valid API path, the client session may be terminated. In an embodiment, the information received by the decoy API may be analyzed for detecting and identifying one or more attack patterns. The attack patterns may thereafter by added to a library of attack patterns or a library of indicators of compromise—such that, the proxy may respond to future instances of detection of similar or identical attack patterns, by rejecting or discarding or appropriately re-routing the client messages responsible for such future instances of similar or identical attack patterns.

In a particular embodiment, the Decoy API System (for example the API front-end or the Decoy API System analyzer generates and transmits a report or alert for each API data message that is addressed to an invalid or non-existent API name.

Figure 10:
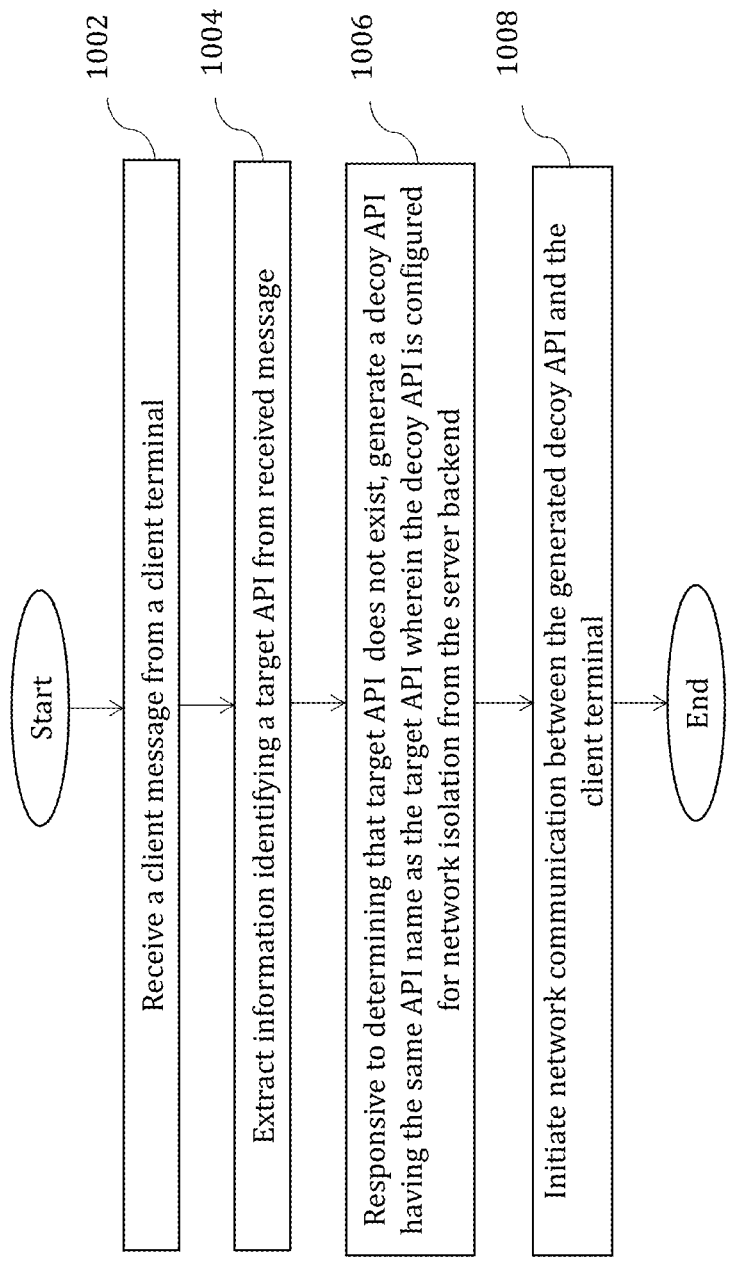

In an embodiment of the invention, one or more decoy APIs can be dynamically created based on the API path names that the attacker tries on the system, and which currently do not exist, as the attacker probes the system to discover a way in. FIG. 10 illustrates an exemplary embodiment of the invention that implements this feature.

Step 1002 comprises receiving a client message or client request from a client terminal—in an embodiment, the client message or client request may be received at a proxy node disposed as an intermediate between clients and a server backend, or as a gateway to a server backend. Step 1004 comprises extracting information identifying a target API from the received message. Responsive to determining that the target API does not exist, it can be concluded that the client message may be part of a probe, scan or brute force attack to gain unauthorized access to a server backend—and step 1006 responds by generating a decoy API having the same API name as the target API—said generated decoy API being configured for network isolation from the server backend. Step 1008 thereafter comprises the step of initiating network communication between the generated decoy API and the client terminal, for the purposes of interacting with attackers and obtaining more information about the attackers and the attack patterns.

The embodiment illustrated in FIG. 10 enables responding to attackers who are found to be probing an unused API path, by automatically generating a decoy API corresponding to that unused API path and having the name of the API path that the attacker has probed. This created new decoy API is configured in a manner that it is ready to capture the same or a different attacker activity as soon as the attacker begins to interact with said decoy API. This process automates the creation and configuration of decoy APIs based on actual attacker activity. It would additionally be understood that the method of FIG. 10 (of generating new decoy APIs in response to an attacker probe for such API) may be carried out either automatically or manually. In a particularly embodiment, such new decoy APIs may be generated or set up by system users, system operators, system administrators, DevOps, or by any party having system permissions to do so.

Figure 11:
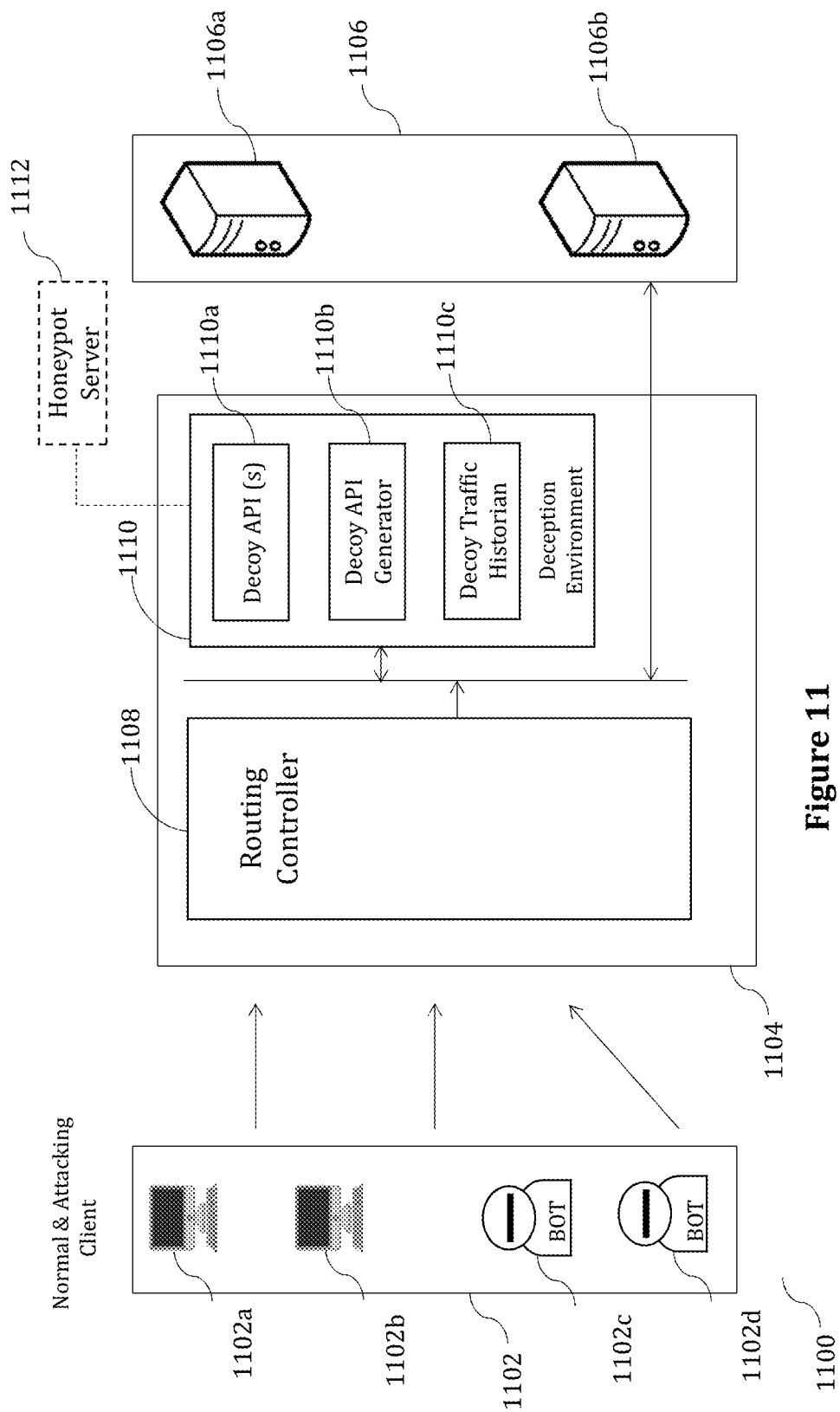
FIG. 11 illustrates a network proxy configured to implement decoy API based API/application security.

FIG. 11 illustrates an embodiment of a system configured to implement the methods of FIGS. 9 and 10.

FIG. 11 illustrates an exemplary system 1100 in accordance with teachings of the present invention, comprising API proxy 1104 disposed as a network intermediate between one or more instances of client(s) 1102 (comprising exemplary client terminal devices 1102a and 1102b and bots 1102c and 1102d) and a server backend 1106 comprising a plurality of servers 1106a and 1106b. API proxy 1104 comprises routing controller 1108 and deception environment 1110. Deception environment in turn includes one or more processor implemented decoy APIs 1110a, a processor implemented decoy API generator 1110b and a decoy traffic historian 1110c. Deception environment 1110 may in an embodiment be communicably coupled with honeypot server 1112.

It would be understood that routing controller 1108 may be configured to select between routing a client message to server backend 1106 and routing the client message to deception environment 1110. In an embodiment of the invention routing controller 1108 may be configured (i) to respond to receipt of client messages that identify a target API that is legitimate and hosted on the server backend 1106 by routing said client to the target API on server backend 1106, and (ii) alternatively, to respond to receipt of client messages that identify a target API that matches the name of a decoy API, or which target API does not exist, by routing said client message to deception environment 1110. If a decoy API corresponding to the target API identified in the client message already exists, the client message may be routed to such decoy API(s) 1110a. In the event no existing decoy API matches the target API identified in the client message, decoy API generator 1110b generates a decoy API that matches the name of the target API—and the client message is thereafter routed to the generated decoy API.

As discussed above, decoy APIs 1110a may be configured to interact with attackers using real or fake data to get various levels of insight into attackers' methods and devices used which are not limited to user agents, time of access, volume of traffic, etc. The system may be configured stores and shares all the IP addresses, and any additional information identifying the suspicious connections in decoy traffic historian 1110c. Such information may be used by systems to drop those connections immediately, continue observing the hacker's activities with respect to those decoy APIs, report those connections via alerts, email and other means of communications, display information dashboards, provide comprehensive reports, etc. It would be understood that by implementing the teachings of FIG. 11, the invention enables rerouting of data messages/data requests from a hacker or attacking client away from a server backend, and into a deception environment to continue observing the behaviour of the attacking entity/anomalous entity, or optionally to block such entity completely. By routing such messages and communications from such entity into the deception environment, the invention ensures that the entity and its messages are precluded from unauthorized access/causing damage to the server backend or other components of the system.

In a particular embodiment of the invention, client messages that have been found to be generated by malicious or attacking clients (or clients that are in violation of one or more predefined security policies) may be routed by deception environment 1110 (or by routing controller 1108) to an external honeypot server which is in network isolation from server backend 1106.

FIG. 12 illustrates an exemplary system 1202 for implementing the present invention.

The compute system 1202 comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1202 in accordance with the present invention may include one or more servers, desktops, laptops, tablets, smart phones, mobile phones, mobile communication devices, tablets, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various software executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The present invention offers an efficient and secure mechanism for detecting fluid loss and verifying the location of fluid loss. The invention additionally ensures that the fluid distribution network is secure and tamper proof, thereby precluding unauthorized persons from altering quantification values received at or received from sensors implemented within the fluid distribution network with a view to conceal losses.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A proxy configured for routing client messages to one or more target Application Programing Interfaces (APIs), the proxy comprising:
    a hardware processor configured to identify or record at least one of:
        parameter data corresponding to one or more client side parameters, wherein:
            the parameter data corresponding to the one or more client side parameters is identified based on analysis of API layer data extracted from data messages received at the proxy; and
            each of the one or more client side parameters comprises a parameter descriptive of client side behavior detected at the proxy;
    and, parameter data corresponding to one or more server side parameters, wherein:
the parameter data corresponding to the one or more server side parameters is identified based on analysis of API layer data extracted from data messages received at the proxy; and
each of the one or more server side parameters comprises a parameter descriptive of (i) requests for server side data received from one or more clients or (ii) server side responses to data messages received from one or more clients;

and
a proxy router configured to:
receive a client message; and
discard the received client message without onward transmission to an API server identified in the received client message, in response to a determination that:
(i) initiating a process for forwarding the received client message to the API server would result in parameter data corresponding to a client side parameter or a server side parameter to exceed a first predefined threshold; or
(ii) receiving a response to the received client message from the API server would result in parameter data corresponding to a server side parameter to exceed a second predefined threshold.

2. The proxy as claimed in claim 1, wherein the hardware processor is configured to identify or record both of:
parameter data corresponding to one or more client side parameters; and
parameter data corresponding to one or more server side parameters.

3. The proxy as claimed in claim 1, wherein the one or more client side parameters includes one or more of client spike, bytes-in-spike, TCP connection spike, message spike and wild card topic substitution.

4. The proxy as claimed in claim 1, wherein the one or more server side parameters includes one or more of server spike, server connection, server connection queuing, bytes-out spike, and topic publisher and subscriber quota.

5. The proxy as claimed in claim 1, wherein the hardware processor is configured to maintain discrete sets of data records corresponding to client side parameters or server side parameters, for each API server within a server backend.

6. The proxy as claimed in claim 1, wherein a determination at the proxy router whether to discard the received client message without onward transmission to the API server identified in the received client message, is based on one or more of device ID, IP address and OAuth2 token corresponding to a client.

7. The proxy as claimed in claim 1, wherein the proxy router is configured to:
transmit the received client message to the API server identified in the received client message, in response to a determination that:
(i) initiating the process for forwarding the received client message to the API server does not result in parameter data corresponding to the client side parameter or the server side parameter exceeding the first predefined threshold; or
(ii) receiving the response to the received client message from the API server does not result in parameter data corresponding to the server side parameter exceeding the second predefined threshold.

8. The proxy as claimed in claim 1, wherein a determination at the proxy router whether to discard the received client message without onward transmission to the API server identified in the received client message is based on an identifier.

9. A system for securing one or more API servers, the system comprising:
a plurality of networked proxy nodes, each proxy node from the plurality of networked proxy nodes is configured for routing client messages to one or more target Application Programming Interfaces (APIs), and each proxy node from the plurality of networked proxy nodes comprises:
a hardware processor configured to identify or record at least one of:
parameter data corresponding to one or more client side parameters, wherein:
the parameter data corresponding to the one or more client side parameters is identified based on analysis of API layer data extracted from data messages received at that proxy node; and
each of the one or more client side parameters comprises a parameter descriptive of client side behavior detected at that proxy node;
and,
parameter data corresponding to one or more server side parameters, wherein:
the parameter data corresponding to the one or more server side parameters is identified based on analysis of API layer data extracted from data messages received at that proxy node; and
each of the one or more server side parameters comprises a parameter descriptive of (i) requests for server side data received from one or more clients or (ii) server side responses to data messages received from one or more clients;
and
a proxy router configured to:
receive a client message; and
discard the received client message without onward transmission to an API server identified in the received client message, in response to a determination that:
(i) initiating a process for forwarding the received client message to the API server would result in parameter data corresponding to a client side parameter or a server side parameter to exceed a first predefined threshold; or
(ii) receiving a response to the received client message from the API server would result in parameter data corresponding to a server side parameter to exceed a second predefined threshold;
wherein each proxy node from the plurality of proxy nodes is configured to synchronize one or more data states of that proxy node with corresponding one or more data states of at least one other proxy node from the plurality of proxy nodes, and wherein the data states under synchronization comprise client side parameter data states or server side parameter data states.

10. The system as claimed in claim 9, wherein the data states under synchronization comprise server side parameter data states and exclude client side parameter data states.

11. A system configured for routing client messages to one or more target Application Programming Interfaces (APIs implemented on a secured server backend, the system comprising:
a proxy comprising:
a hardware processor configured to detect indicators of compromise based on API layer data extracted from client messages received at the proxy, wherein the indicators of comprise are detected responsive to any one of:
determining that a target API name extracted from a client message matches a decoy API name that is determinable by scanning of API data on the proxy; or
determining that the target API name extracted from the client message does not match any API to which the proxy is configured to route client messages;
a proxy router configured to respond to detection of an indicator of compromise by routing the client message corresponding to the detected indicator of compromise to a decoy API having an API name that matches the target API name extracted from the client message corresponding to the detected indicator of compromise, wherein said decoy API is communicably isolated from the secured server backend; and
one or more processor implemented decoy APIs configured to respond to client messages received from the proxy router by:
initiating network communication with a client that generated the client message; and
recording information corresponding to said client and client messages generated by said client.

12. The system as claimed in claim 11, wherein the client message is a first client message, said system is configured to respond to a determination that a target API name extracted from a second client message does not match any API to which the proxy is configured to route client messages, by:
generating a processor implemented decoy API having an API name that matches the target API name extracted from the second client message, and routing the second client message to the processor implemented decoy API, wherein:
the processor implemented decoy API is communicably isolated from the secured server backend; and
said processor implemented decoy API is configured to respond to client messages received from the proxy router by:
initiating network communication with the client that has generated the received client messages; and
recording information corresponding to said client and client messages generated by said client.

13. A method for routing client messages to one or more target Application Programming Interfaces (APIs), the method comprising:
receiving a client message at a proxy interposed as a network communication gateway to a server backend configured to implement one or more APIs;
discarding the received client message without onward transmission to an API server identified in the received client message, in response to a determination that:
(i) initiating a process for forwarding the received client message to the server backend would result in parameter data corresponding to a client side parameter or a server side parameter to exceed a first predefined threshold; or
(ii) receiving a response to the received client message from the server backend would result in parameter data corresponding to a server side parameter to exceed a second predefined threshold;
wherein:
parameter data corresponding to one or more client side parameters is identified based on analysis of API layer data extracted from data messages received at the proxy;
each of the one or more client side parameters comprises a parameter descriptive of client side behavior detected at the proxy;
parameter data corresponding to one or more server side parameters, is identified based on analysis of API layer data extracted from data messages received at the proxy; and
each of the one or more server side parameters comprises a parameter descriptive of (i) requests for server side data received from one or more clients or (ii) server side responses to data messages received from the one or more clients.

14. The method as claimed in claim 13, comprising identifying or recording both of:
the parameter data corresponding to the one or more client side parameters; and
the parameter data corresponding to the one or more server side parameters.

15. The method as claimed in claim 13, wherein the one or more client side parameters includes one or more of client spike, bytes-in-spike, TCP connection spike, message spike and wild card topic substitution.

16. The method as claimed in claim 13, wherein the one or more server side parameters includes one or more of server spike, server connection, server connection queuing, bytes-out spike, and topic publisher and subscriber quota.

17. The method as claimed in claim 13, wherein a determination whether to discard the received client message without onward transmission to the API server identified in the received client message, is based on one or more of device ID, IP address and OAuth2 token corresponding to a client.

18. The method as claimed in claim 13, further comprising:
transmitting the received client message to the API server identified in the received client message and implemented within the server backend, in response to a determination that:
(i) initiating the process for forwarding the received client message to the API server does not result in parameter data corresponding to the client side parameter or the server side parameter exceeding the first predefined threshold value; or
(ii) receiving the response to the received client message from the API server does not result in parameter data corresponding to the server side parameter exceeding the second predefined threshold.

19. The method as claimed in claim 13, wherein the proxy is configured to synchronize one or more data states of said proxy with corresponding one or more data states of at least one other proxy that is interposed as a network communication gateway to the server backend, and wherein the data states under synchronization comprise client side parameter data states or server side parameter data states.

20. The method as claimed in claim 19, wherein the data states under synchronization comprise server side parameter data states and exclude client side parameter data states.

21. The method as claimed in claim 13, wherein a determination whether to discard the received client message without onward transmission to the API server identified in the received client message is based on an identifier.

22. A method for routing client messages to one or more target Application Programming Interfaces (APIs) implemented on a secured server backend, the method comprising:
detecting an indicator of compromise based on API layer data extracted from client messages received at a proxy, wherein the detected indicator of comprise is detected responsive to any one of:
determining that a target API name extracted from a client message matches a decoy API name that is determinable by scanning of API data on the proxy; or
determining that the target API name extracted from the client message does not match any API to which the proxy is configured to route client messages;
responding to detection of the indicator of compromise by routing the client message corresponding to the detected indicator of compromise to a decoy API having an API name that matches the target API name extracted from the client message corresponding to the detected indicator of compromise, wherein said decoy API is communicably isolated from the secured server backend;
initiating at the decoy API, network communication with a client that has generated the client message; and
recording information corresponding to said client and client messages generated by said client.

23. The method as claimed in claim 22, further comprising the step of responding to a determination that the client in network communication with said decoy API is a client in breach of one or more predefined security policies, by routing one or more communications from said client to an external honeypot server that is communicably isolated from the secured server backend.

24. The method as claimed in claim 22, further comprising responding to determining that the target API name extracted from the client message does not match any API to which the proxy is configured to route client messages, by generating a processor implemented decoy API having an API name that matches the target API name, and routing the client message to the generated processor implemented decoy API, wherein:
the processor implemented decoy API is communicably isolated from the secured server backend; and
said processor implemented decoy API is configured to respond to client messages received from a proxy router by:
initiating network communication with the client that has generated the received client messages; and
recording information corresponding to said client and client messages generated by said client.

25. The method as claimed in claim 22, wherein the decoy API is dynamically generated.

26. The method as claimed in claim 22, wherein the decoy API is manually generated.

27. A computer program product for routing client messages to one or more Application Programming Interfaces (APIs), comprising a non-transitory computer readable medium having a computer readable program code embodiment therein, the computer readable program code comprising instructions for:
receiving a client message at a proxy interposed as a network communication gateway to a server backend configured to implement the one or more APIs;
discarding the received client message without onward transmission to an API server identified in the received client message, in response to a determination that:
(i) initiating a process for forwarding the received client message to the server backend would result in parameter data corresponding to a client side parameter or a server side parameter to exceed a first predefined threshold; or
(ii) receiving a response to the received client message from the server backend would result in parameter data corresponding to the server side parameter to exceed a second predefined threshold;
wherein:
parameter data corresponding to one or more client side parameters is identified based on analysis of API layer data extracted from data messages received at the proxy;
each of the one or more client side parameters comprises a parameter descriptive of client side behavior detected at the proxy;
parameter data corresponding to one or more server side parameters, is identified based on analysis of API layer data extracted from data messages received at the proxy; and
each of the one or more server side parameters comprises a parameter descriptive of (i) requests for server side data received from one or more clients or (ii) server side responses to data messages received from the one or more clients.

28. A computer program product for routing client messages to one or more target Application Programming Interfaces (APIs) implemented on a secured server backend, comprising a non-transitory computer readable medium having a computer readable program code embodiment therein, the computer readable program code comprising instructions for:
detecting an indicator of compromise based on API layer data extracted from client messages received at a proxy, wherein the detected indicator of comprise is detected responsive to any one of:
determining that a target API name extracted from a client message matches a decoy API name that is determinable by scanning of API data on the proxy; or
determining that the target API name extracted from the client message does not match any API to which the proxy is configured to route client messages;
responding to detection of the indicator of compromise by routing the client message corresponding to the detected indicator of compromise to a decoy API having an API name that matches the target API name extracted from the client message corresponding to the detected indicator of compromise, wherein said decoy API is communicably isolated from the secured server backend;
initiating at the decoy API, network communication with a client that has generated the client message; and
recording information corresponding to said client and client messages generated by said client.

* * * * *

UNITED STATES PATENT AND TRADEMARK OFFICE
CERTIFICATE OF CORRECTION

PATENT NO. : 10,587,580 B2
APPLICATION NO. : 15/792850
DATED : March 10, 2020
INVENTOR(S) : Udayakumar Subbarayan et al.

Page 1 of 1

It is certified that error appears in the above-identified patent and that said Letters Patent is hereby corrected as shown below:

In the Specification

At Column 13, Line 48, delete "proxy–the purposes of determining whether the client" and insert -- proxy–for the purposes of determining whether the client --

In the Claims

Column 23, Line 2, (Claim 11) delete "or more target Application Programming Interfaces (APIs" and insert -- or more target Application Programming Interfaces (APIs) --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*